United States Patent
Ganigarakoppal Kantharaju et al.

(10) Patent No.: US 12,535,973 B1
(45) Date of Patent: Jan. 27, 2026

(54) DYNAMIC BIFURCATED BUS WIDTH RAID STORAGE SYSTEM

(71) Applicant: Dell Products L.P., Round Rock, TX (US)

(72) Inventors: Nikhith Ganigarakoppal Kantharaju, Hassan (IN); Abhijit Shashikant Mirajkar, Bangalore (IN); Sumalatha Pagadala, Bangalore (IN); Sushmitha Naik, Udupi (IN); Lokanarahari Vankam, Hindupur (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/905,391

(22) Filed: Oct. 3, 2024

(51) Int. Cl.
*G06F 3/00* (2006.01)
*G06F 3/06* (2006.01)

(52) U.S. Cl.
CPC ............ *G06F 3/0689* (2013.01); *G06F 3/061* (2013.01); *G06F 3/0655* (2013.01)

(58) Field of Classification Search
None
See application file for complete search history.

(56) References Cited

U.S. PATENT DOCUMENTS

| 10,445,279 B1 | 10/2019 | Itkin et al. |
| 2005/0144404 A1* | 6/2005 | Nashimoto ........... G06F 3/0635 711/113 |

* cited by examiner

Primary Examiner — Midys Rojas
(74) Attorney, Agent, or Firm — Joseph Mencher

(57) ABSTRACT

A dynamic bifurcated bus width RAID storage system includes storage devices coupled to a root port on a processor via a switch that provides a respective bifurcated bus to transfer data between each storage device and the root port. A bifurcated bus width modification subsystem monitors the storage devices during their provisioning of a RAID storage system, determines that a RAID data movement operation is required, and retrieves a bifurcated bus width for each respective bifurcated bus provided by the switch to transfer data between each storage device and the root port. The bifurcated bus width modification subsystem then identifies a first storage device to which data will be written as part of the RAID data movement operation and, prior to its performance, increases a first bifurcated bus width for a first bifurcated bus provided by the switch to transfer data between the first storage device and the root port.

20 Claims, 22 Drawing Sheets

DYNAMIC BIFURCATED BUS WIDTH RAID STORAGE SYSTEM

BACKGROUND

The present disclosure relates generally to information handling systems, and more particularly to providing dynamic bifurcated bus widths for dynamic bifurcated buses used in a Redundant Array of Independent Disk (RAID) storage system that is provided by an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as for example, server devices, storage systems, and/or other computing devices known in the art, may store data using a Redundant Array of Independent Disk (RAID) storage system, which one of skill in the art will recognize uses a data storage virtualization technology that provides logical storage using physical storage devices while providing data redundancy, performance improvements, and/or other RAID storage benefits known in the art. Some RAID storage systems utilize a RAID driver that is provided by a processing system included on a chipset of the computing device, with the storage devices coupled to a root port on the processing system via a switch included on the chipset (e.g., multiple Non-Volatile Memory express (NVMe) storage devices may be coupled to a single root port on the processing system via respective ports on a Peripheral Component Interconnect express (PCIe) switch that is included on the chipset and connected to that root port). In conventional RAID storage systems, a root port bus of the root port will be bifurcated via the switch to provide a bifurcated bus to each storage device via the respective port on the switch to which that storage device is connected, which can raise issues.

For example, the conventional provisioning of the bifurcated bus to each storage device as discussed above is a static process that the inventors of the present disclosure have recognized can operate to limit the performance of RAID operations. To provide a specific, simplified example, four conventional physical NVMe storage devices may be coupled to the processing system via the PCIe switch as discussed above, and one of skill in the art in possession of the present disclosure will appreciate how the connection of each conventional physical NVMe storage device (e.g., provided by U.2 NVMe storage devices, E.3 NVMe storage devices, etc.) to a respective port on the PCIe switch may provide four physical communication channels between that conventional physical NVMe storage device and the PCIe switch. Continuing with this specific example, the root port on the processing system may provide a root port bus with a "×8" root port bus width, and that root port bus may be bifurcated via the PCIe switch to provide a respective bifurcated bus having a "×2" bifurcated bus width to each of the four conventional physical NVMe storage devices (i.e., the PCIe switch will be configured, for each conventional physical NVMe storage device, to utilize a maximum of two of the four physical communication channels available between that conventional physical NVMe storage device and its port to which that conventional NVMe storage device is connected).

In many situations, it may be desirable to complete some RAID operations (e.g., data rebuild operations that, in response to the unavailability of a first storage device that provides the RAID storage system, operate to rebuild data and provide it on a replacement storage device that provided in the RAID storage system, Online Capacity Expansion (OCE) operations that expand the storage capacity of the RAID storage system, etc.) relatively quickly due to the possibility of data loss (e.g., in the event a second storage device in the RAID storage system also becomes unavailable during the data rebuild operations in the example above) and/or the effect of those RAID operations on RAID storage system performance (e.g., any changes to the RAID storage system during the relative resource-intensive OCE operations discussed above may require those OCE operations to be restarted). However, the inventors of the present disclosure have recognized that the static bifurcated buses provided for each storage device as described above tend to operate as a bottleneck during such RAID operations that extends the amount of time needed to complete those RAID operations.

Accordingly, it would be desirable to provide a RAID storage system that addresses the issues described above.

SUMMARY

According to one embodiment, an Information Handling System (IHS) includes a bifurcated bus width modification processing system; and a bifurcated bus width modification memory system that is coupled to the bifurcated bus width modification processing system and that includes instructions that, when executed by the bifurcated bus width modification processing system, cause the bifurcated bus width modification processing system to provide a bifurcated bus width modification engine that is configured to: monitor a plurality of storage devices that are coupled to the bifurcated bus width modification processing system during the provisioning of a Redundant Array of Independent Disk (RAID) storage system by the plurality of storage devices; determine, in response to the monitoring of the plurality of storage devices, that a RAID data movement operation is required; retrieve, in response to determining that the RAID data movement operation is required, a bifurcated bus width for each respective bifurcated bus provided by a switch device to transfer data between each of the plurality of storage devices and a root port in a primary processing system; identify a first storage device that is included in the plurality of storage devices and to which data will be written as part of the RAID data movement operation; and increase, prior to performance of the RAID data movement operation, a first bifurcated bus width for a first bifurcated bus provided by the switch device to transfer data between the first storage device and the root port.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
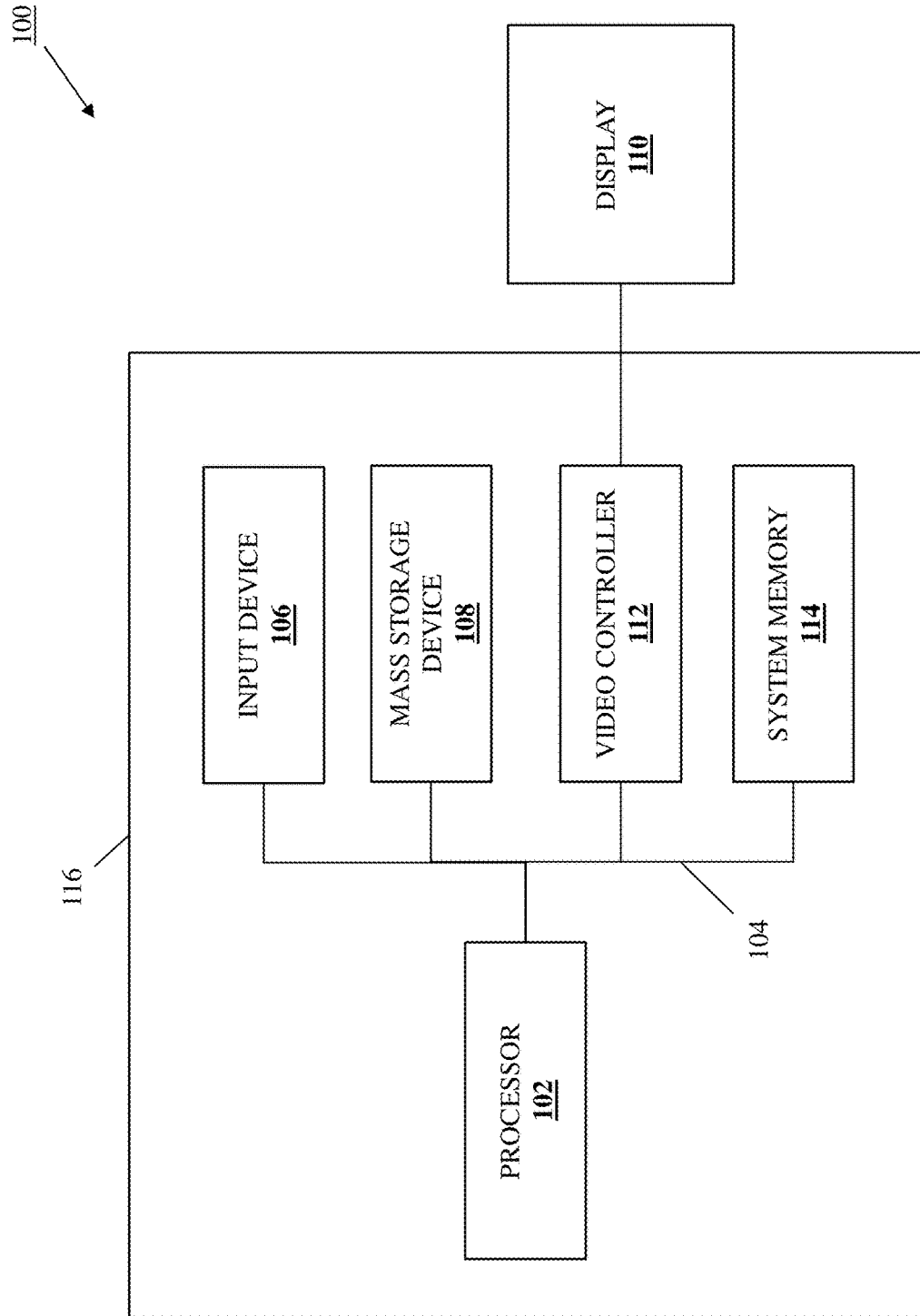
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
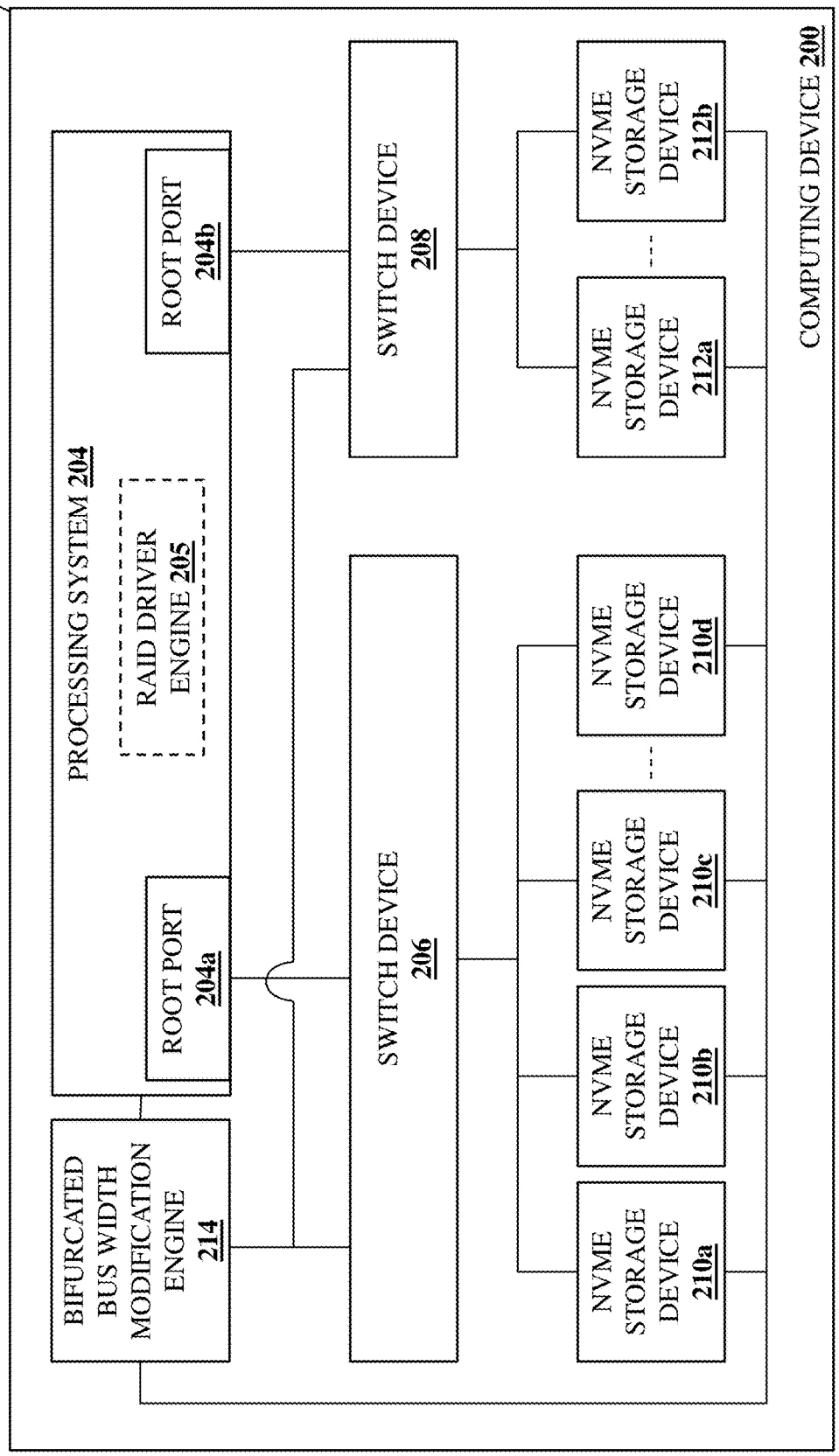
FIG. 2 is a schematic view illustrating an embodiment of a computing device that may provide the dynamic bifurcated bus width RAID storage system of the present disclosure.

Referring now to FIG. 2, an embodiment of a computing device 200 is illustrated that may provide the dynamic bifurcated bus width RAID storage system of the present disclosure. In an embodiment, the computing device 200 may be provided by the IHS 100 discussed above with reference to FIG. 1 and/or may include some or all of the components of the IHS 100, and in specific examples may be provided by a server device, a storage system, and/or any other computing devices that would be apparent to one of skill in the art in possession of the present disclosure. Furthermore, while illustrated and discussed as being provided by particular computing devices, one of skill in the art in possession of the present disclosure will recognize that the functionality of the computing device 200 discussed below may be provided by other devices that are configured to operate similarly as the computing device 200 discussed below.

In the illustrated embodiment, the computing device 200 includes a chassis 202 that houses the components of the computing device 200, only some of which are illustrated and described below. For example, the chassis 202 may house a processing system 204 (e.g., that may include the processor 102 discussed above with reference to FIG. 1 such as a Central Processing Unit (CPU) and/or other primary processing systems known in the art). In a specific example, the processing system 204 is included on a chipset that is provided in the chassis 202, although the provisioning of the processing system 204 using other techniques is envisioned as falling within the scope of the present disclosure as well. In the illustrated embodiment, the processing system 204 includes a pair of root ports 204a and 204b, and while only two root ports are illustrated and described, one of skill in the art in possession of the present disclosure will appreciate how the processing system 204 may include additional root ports that operate similarly to the root ports 204a and 204b discussed below while remaining within the scope of the present disclosure. In a specific example below, the root port 204a is described as providing a root port bus having a root port bus width of "×8" (i.e., with the root port bus providing 8 physical communication channels), but one of skill in the art in possession of the present disclosure will appreciate how other root port bus widths (e.g., "×4", "×16", "×32", etc.) will fall within the scope of the present disclosure as well.

In the embodiments illustrated and described below, the processing system 204 is configured to provide a RAID driver engine 205. For example, the chassis 202 may include a memory system (not illustrated, but which may include the memory 114 discussed above with reference to FIG. 1 such as, for example, Dynamic Random Access Memory (DRAM)) including instructions that, when executed by the processing system 204, cause the processing system 204 to provide the RAID driver engine 205 (e.g., as part of an operating system provided by the processing system 204) that is configured to perform the operations of the RAID driver engines, RAID driver subsystems, operating systems, and/or computing devices described below.

As illustrated, the chassis 202 may also house a switch device 206 that is coupled to the root port 204a, and a switch device 208 that is coupled to the root port 204b. In a specific example, the switch devices 206 and 208 may be provided by Peripheral Component Interconnect express (PCIe) switch devices that may be included on the chipset with the processing system 204 described above. However, while a specific example of the switch devices 206 and 208 is illustrated and described herein, one of skill in the art in possession of the present disclosure will appreciate how the switch devices of the present disclosure may be provided in other manners that will fall within the scope of the present disclosure as well.

Each of the switch devices 206 and 208 may be coupled to a plurality of storage devices, with the illustrated embodiments including a plurality of Non-Volatile Memory express (NVMe) storage devices 210a, 210b, 210c, and up to 210d coupled to the switch device 206, and a plurality of NVMe storage device 212a and up to 212b coupled to the switch device 208. However, while particular types of storage devices are illustrated and described below, one of skill in the art in possession of the present disclosure will appreciate how other types of storage devices will fall within the scope of the present disclosure as well. As described below, the storage devices 210a-210d may be configured to provide a "first" RAID logical storage system used in some of the examples discussed below, and one of skill in the art in possession of the present disclosure will appreciate how the storage devices 212a-212b may be configured to provide a "second" RAID logical storage system in a similar manner.

The chassis 202 may also house a bifurcated bus width modification processing system (not illustrated, but which may be similar to the processor 102 discussed above with reference to FIG. 1) and a bifurcated bus width modification memory system (not illustrated, but which may be similar to the memory 114 discussed above with reference to FIG. 1) that includes instruction that, when executed by the bifurcated bus width modification processing system, cause the bifurcated bus width modification processing system to provide a bifurcated bus width modification engine 214 that is configured to perform the operations of the bifurcated bus width modification engines, bifurcated bus width modification subsystems, and/or computing devices described below. As illustrated, the bifurcated bus width modification engine 214 may be couped to the processing system 204 (via a coupling between the bifurcated bus width modification processing system and the processing system 204), the switch devices 206 and 208 (via a coupling between the bifurcated bus width modification processing system and the switch devices 206 and 208), and to each of the NVMe storage devices 210a-210d and 212a-212b (via a coupling between the bifurcated bus width modification processing system and each of the NVMe storage devices 210a-210d and 212a-212b).

In some examples, the bifurcated bus width modification engine 214 may be provided in a Baseboard Management Controller (BMC) device such as, for example, the integrated DELL® Remote Access Controller (iDRAC) available in server devices provided by DELL® Inc. of Round Rock, Texas, United States, in order to provide an out-of-band technique for performing the bifurcated bus width modifications described below. However, in other examples, the bifurcated bus width modification engine 214 may be provided by an application included in an operating system (e.g., provided by the processing system 204 as described above) in order to provide an in-band technique for performing the bifurcated bus width modifications described below. However, while a few specific examples have been provided, one of skill in the art in possession of the present disclosure will appreciate how the bifurcated bus width modification engine 214 may be provided in a variety of manners that will fall within the scope of the present disclosure as well.

Furthermore, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the bifurcated bus width modification functionality discussed below, while remaining within the scope of the present disclosure as well.

Figure 3:
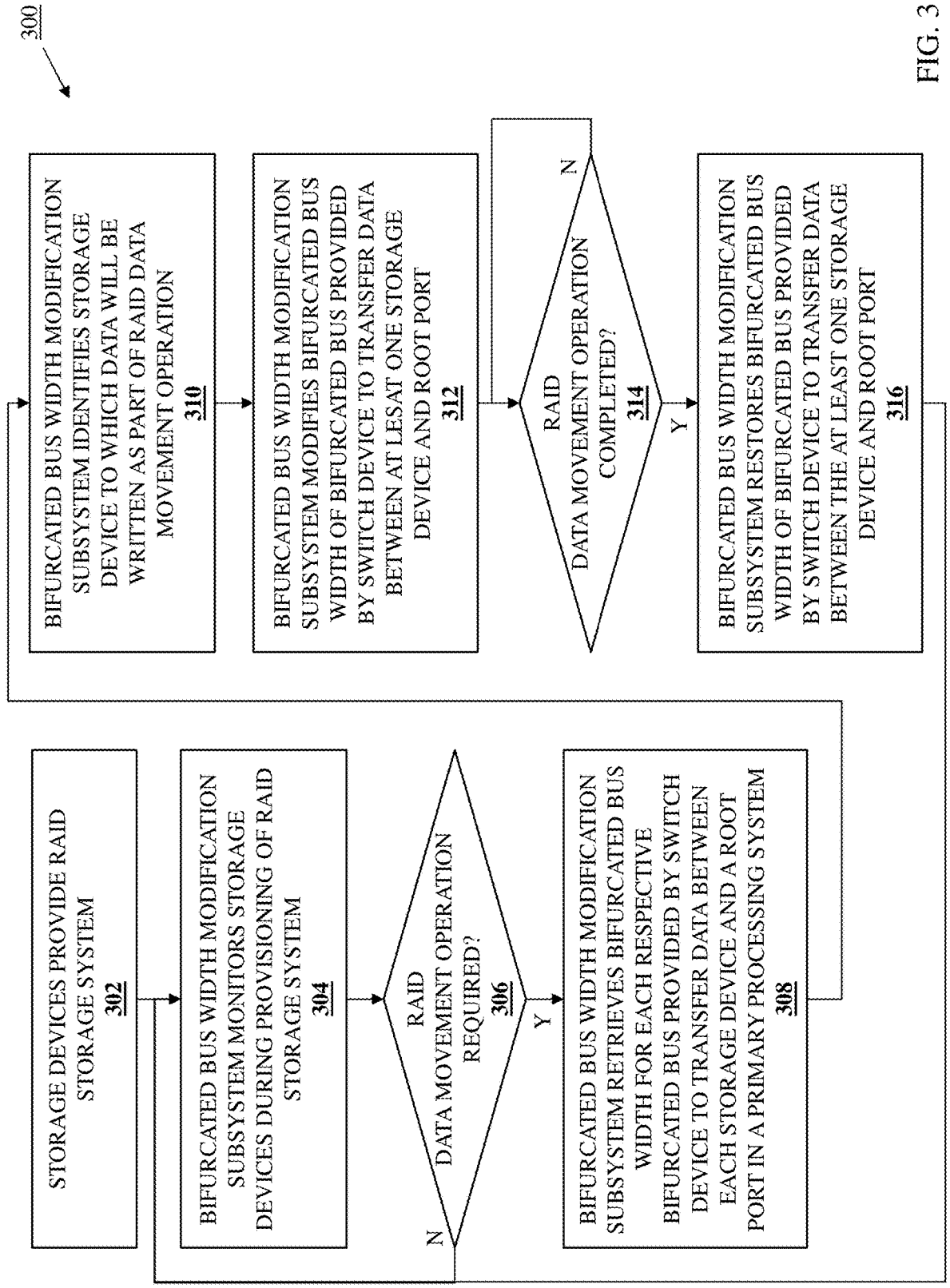
FIG. 3 is a flow chart illustrating an embodiment of a method for providing dynamic bifurcated bus widths for bifurcated buses used in a RAID storage system.

Referring now to FIG. 3, an embodiment of a method 300 for providing dynamic bifurcated bus widths for bifurcated buses used in a Redundant Array of Independent Disk (RAID) storage system is illustrated. As discussed below, the systems and methods of the present disclosure provide for the dynamic modification of bifurcated bus widths of bifurcated bus(es) that are provided by a switch device to transfer data in a RAID storage system between storage device(s) and a root port on a primary processing system. For example, the dynamic bifurcated bus width RAID storage system of the present disclosure may include storage devices coupled to a root port on a processor via a switch that provides a respective bifurcated bus to transfer data between each storage device and the root port. A bifurcated bus width modification subsystem monitors the storage devices during their provisioning of a RAID storage system, determines that a RAID data movement operation is required, and retrieves a bifurcated bus width for each respective bifurcated bus provided by the switch to transfer data between each storage device and the root port. The bifurcated bus width modification subsystem then identifies a first storage device to which data will be written as part of the RAID data movement operation and, prior to its performance, increases a first bifurcated bus width for a first bifurcated bus provided by the switch to transfer data between the first storage device and the root port. As such, RAID data movement operations may be completed relatively quickly (as compared to RAID data movement operations performed in conventional RAID storage systems) by allocating available bifurcated bus bandwidth to storage device(s) that would otherwise introduce bottleneck(s) in those RAID data movement operations.

Figure 4:
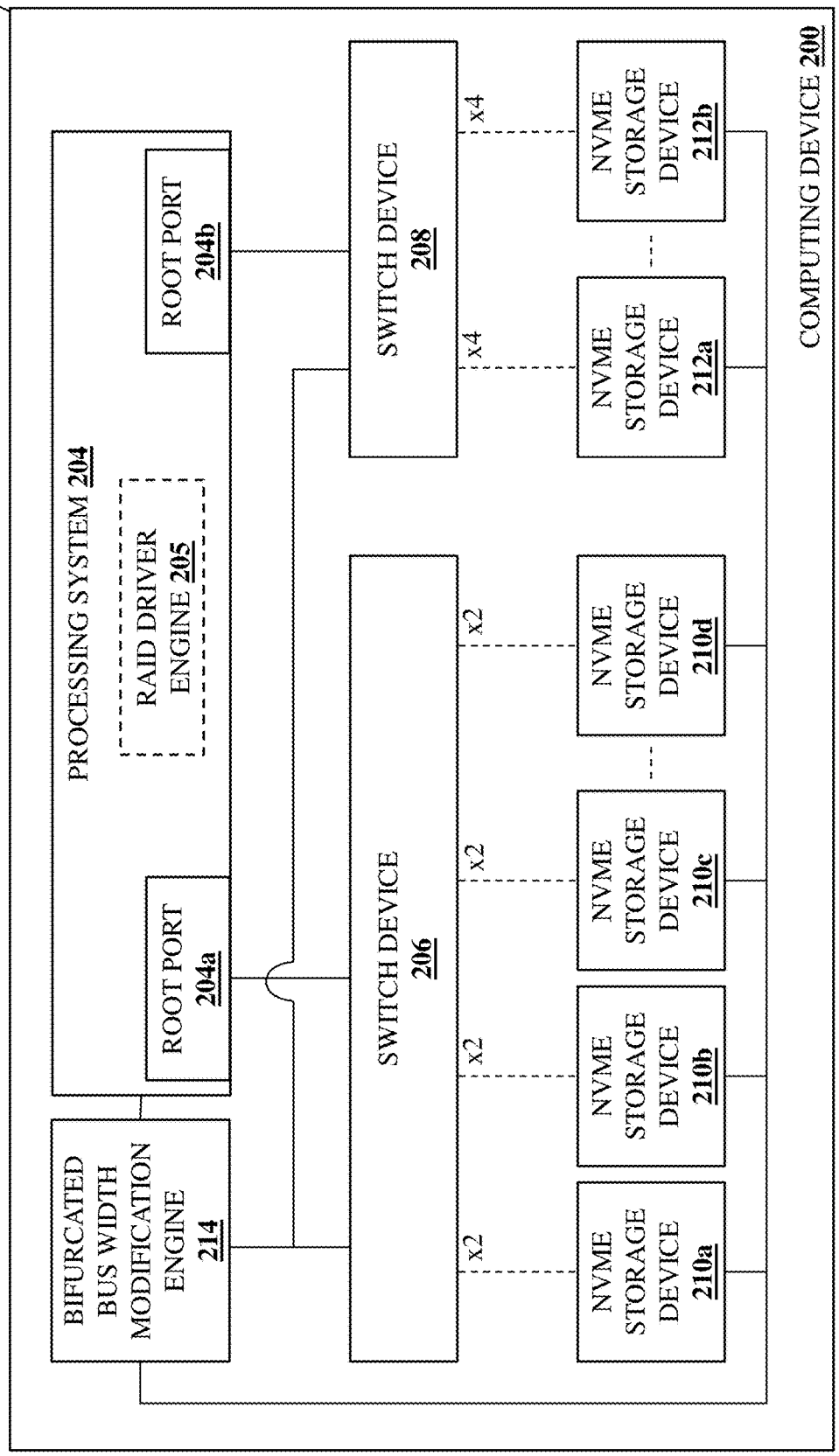
FIG. 4 is a schematic view illustrating an embodiment of the computing device of FIG. 2 operating during the method of FIG. 3.

The method 300 begins at block 302 where storage devices provide a RAID storage system. With reference to FIG. 4, in an embodiment of block 302, the NVMe storage devices 210a-210d may be configured to provide a first RAID storage system, while the NVMe storage devices 212a-212b may be configured to provide a second RAID storage system. In the examples below, the first RAID storage system provided by the NVMe storage devices 210a-210d is described as including by three "active" NVMe storage devices and a "hot spare" NVMe storage device, but one of skill in the art in possession of the present disclosure will appreciate how the examples below provide a simplified example for purposes of discussion, and how RAID storage systems utilizing many more and/or different configurations of storage devices will fall within the scope of the present disclosure as well. Furthermore, the second RAID storage system provided by the NVMe storage devices 212a-212b is briefly described as including two NVMe storage device, and one of skill in the art in possession of the present disclosure will recognize how the second RAID storage system may operate similarly as described below for the first RAID storage system.

In a specific embodiment, at block 302, the computing device 200 may be powered on, booted, reset, rebooted, and/or otherwise initialized and, in response, the switch device 206 may initialize and configure the first RAID storage system provided using the NVMe storage devices 210a-210d. In some examples, the initialization of the switch device 206 may include the switch device 206 performing bifurcation operations using the root port bus provided by the root port 204a, which may include identifying a default bifurcated bus width for bifurcated buses for each of the NVMe storage devices 210a-210d, and bifurcating the root port bus to provide a respective bifurcated bus to each of the NVMe storage devices 210a-210d for the transfer of data between the NVMe storage devices 210a-210d and the root port 204a. However, while described below as being performed by the switch device 206 in response to its initialization, one of skill in the art in possession of the present disclosure will appreciate how the RAID driver engine 205 may configure the switch devices 206 and 208 to provide the bifurcated bus(es) for the NVMe storage devices 210a-210d and 212a-212b, respectively, while remaining within the scope of the present disclosure as well.

Continuing with the specific example above in which the root port bus width of the root port bus provided by the root port 204a is "×8" (i.e., providing 8 physical communication channels between the root port 204a and the switch device 206), the switch device 206 may identify a default bifurcated bus width of "×2" (i.e., a default use of a maximum of 2 of the 4 available physical communication channels between each NVMe storage device 210a-210d and the respective port on the switch device 206 to which that NVMe storage device is connected as discussed in the specific example provided above) and, in response, may perform bifurcated bus provisioning operations that may include configuring switch bifurcation registers in the switch device 206 to provide a respective "×2" bifurcated bus for each of the NVMe storage devices 210a-210d (i.e., the switch device 206 may split the "×8" root port bus width of the root port bus provided by the root port 204a evenly between each of the NVMe storage devices 210a-210d, as illustrated in FIG. 4). However, while a specific root port bus width and default bifurcated bus width have been described, one of skill in the art in possession of the present disclosure will appreciate how different root port bus widths and default bifurcated bus width will fall within the scope of the present disclosure as well.

While not described in detail herein, one of skill in the art in possession of the present disclosure will recognize how the bifurcated buses provided for each of the NVMe storage devices 212a-212b for the transfer of data between the NVMe storage devices 212aa-212b and the root port 204b may be configured similarly as described above, with the specific example illustrated in FIG. 4 illustrating an embodiment in which a "×8" root port bus width of the root port bus provided by the root port 204b is bifurcated to provide bifurcated buses for each of the NVMe storage devices 212a-212b that each have a "×4" bifurcated bus width. While also not described in detail herein, one of skill in the art in possession of the present disclosure will appreciate how the RAID driver engine 205, the processing system 204, the root ports 204a and 240b, the switch devices 206 and 208, and the NVMe storage devices 210a-210d and 212a-212b may be configured using any of a variety of RAID configuration operations known in the art in order to enable their provisioning of the first RAID storage system and the second RAID storage system, respectively, at block 302.

As such, one of skill in the art in possession of the present disclosure will appreciate how, during block 302, the RAID driver subsystem 205, the processing system 204, the root port 204a, the switch device 206, and the NVMe storage devices 210a-210d may operate to write data to, read data from, and/or perform other RAID storage system provisioning operations (i.e., using the bifurcated buses each having the "×2" bifurcated bus width) in order to provide the first RAID storage system. Similarly, one of skill in the art in possession of the present disclosure will appreciate how, during block 302, the RAID driver subsystem 205, the processing system 204, the root port 204*b*, the switch device 208, and the NVMe storage devices 212*a*-212*b* may operate to write data to, read data from, and/or perform other RAID storage system provisioning operations (i.e., using the bifurcated buses each having the "×4" bifurcated bus width) in order to provide the second RAID storage system. Furthermore, while illustrated and described as occurring at block 302, one of skill in the art in possession of the present disclosure will recognize that the provisioning of RAID storage system(s) by storage devices may be performed throughout the method 300 discussed below.

Figure 5A:
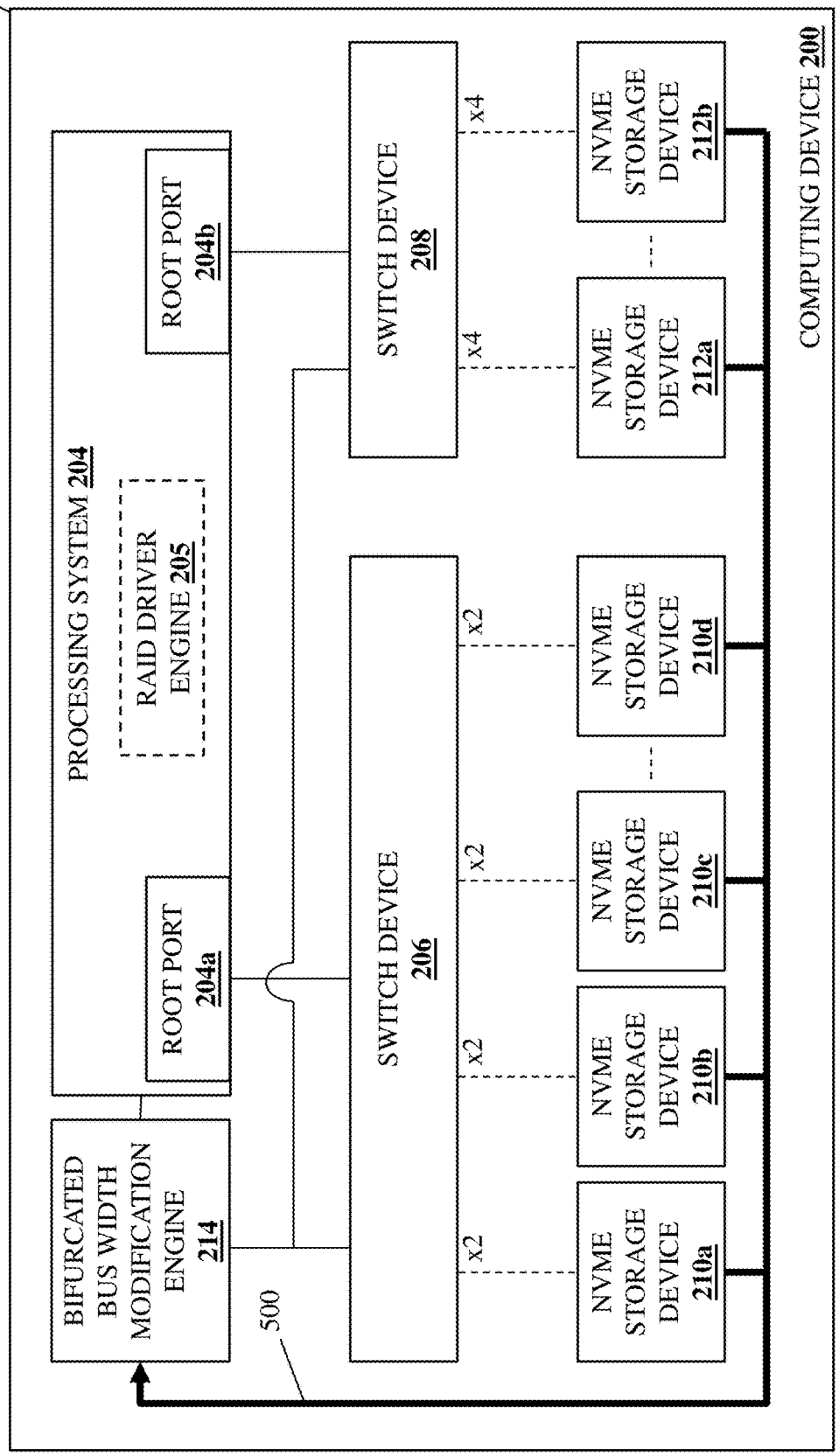
FIG. 5A is a schematic view illustrating an embodiment of the computing device of FIG. 2 operating during the method of FIG. 3.

The method 300 then proceeds to block 304 where a bifurcated bus width modification subsystem monitors storage devices during provisioning of the RAID storage system. With reference to FIG. 5A, in an embodiment of block 304 and during the provisioning of the RAID storage system by the NVMe storage devices 210*a*-210*d* and 212*a*-212*b*, the bifurcated bus width modification engine 214 may perform RAID storage system monitoring operations 500 that may include monitoring the operation of each of the NVMe storage devices 210*a*-210*d* and 212*a*-212*b* during their provisioning of the first RAID storage system and the second RAID storage system as described above. For example, the RAID storage system monitoring operations 500 may include retrieving, from each of the NVMe storage devices 210*a*-210*d* and 212*a*-212*b*, respective storage device health information (e.g., Self-Monitoring, Analysis, and Reporting Technology (SMART) data generated by that NVMe storage device). As described above, the RAID storage system monitoring operations 500 may be out-of-band operations when the bifurcated bus width modification engine 214 is provided by a BMC device, or in-band operations when the bifurcated bus width modification engine 214 is provided by an operating system, and may be performed periodically as the NVMe storage devices 210*a*-210*d* and 212*a*-212*b* provide the first RAID storage system and the second RAID storage system.

The method 300 then proceeds to decision block 306 where it is determined whether a RAID data movement operation is required. In an embodiment, at decision block 306 and based on the monitoring of the NVMe storage devices 210*a*-210*d* and 212*a*-212*b* during their provisioning of the first RAID storage system and the second RAID storage system, respectively, the bifurcated bus width modification engine 214 may determine whether a RAID data movement operation is required for the first RAID storage system provided by the NVMe storage devices 210*a*-210*d* and/or the second RAID storage system provided by the NVMe storage devices 212*a*-212*b*. For example, at decision block 306, by the bifurcated bus width modification engine 214 may analyze the respective storage device health information retrieved from each of the NVMe storage devices 210*a*-210*d* and 212*a*-212*b* during the RAID storage system monitoring operations 500, (e.g., the SMART data generated by that NVMe storage device) and, in some embodiments, compare that storage device health information to threshold value(s), to determine whether a RAID data movement operation is required.

In one of the examples below, the analysis of the respective storage device health information retrieved from each of the NVMe storage devices 210*a*-210*d* and 212*a*-212*b* identifies an unavailability of one of those NVMe storage devices that requires a RAID data movement operation provided by any of a variety of RAID data rebuild operations that would be apparent to one of skill in the art in possession of the present disclosure. In another of the examples below, the analysis of the respective storage device health information retrieved from each of the NVMe storage devices 210*a*-210*d* and 212*a*-212*b* determines that the storage device health information for one of those NVMe storage devices exceeds one or more thresholds that are indicative of a relatively imminent unavailability of that NVMe storage device that requires a RAID data movement operation provided by any of a variety of RAID data copy operations that would be apparent to one of skill in the art in possession of the present disclosure.

However, while two specific examples of the analysis of storage device health information to identify an unavailability or relatively imminent unavailability of an NVMe storage device are described in detail, one of skill in the art in possession of the present disclosure will appreciate how RAID data movement operations may be required based on the monitoring of the NVMe storage devices 210*a*-210*d* and 212*a*-212*b* during their provisioning of the first RAID storage system and the second RAID storage system, respectively, for a variety of reasons that will fall within the scope of the present disclosure as well. For example, at decision block 306 and based on the RAID storage system monitoring operations 500 performed at block 304, the bifurcated bus width modification engine 214 may determine that a network administrator or other user is beginning Online Capacity Expansion (OCE) operations to expand the storage capacity of the first RAID storage system provided by the NVMe storage devices 210*a*-210*d* and, in response will determine that RAID data movement operations are required as part of those OCE operations. As such, RAID data movement operations required for a RAID storage system may be identified for any of a variety of reasons while remaining within the scope of the present disclosure.

If, at decision block 306, it is determined that no RAID data movement operation is required, the method 300 returns to block 304. In an embodiment, at decision block 306, the analysis of the respective storage device health information retrieved from each of the NVMe storage devices 210*a*-210*d* and 212*a*-212*b* does not identify any unavailability or relatively imminent unavailability of any of those NVMe storage devices, any storage capacity expansion of the first or second RAID storage system, and/or any other issue that requires a RAID data movement operation, and the method 300 returns to block 304. As such, the method 300 may loop such that the bifurcated bus width modification engine 214 continues to monitor the NVMe storage devices 210*a*-210*d* and 212*a*-212*b* during their provisioning of the first RAID storage system and the second RAID storage system, respectively, until it is determined that a RAID data movement operation is required.

If, at decision block 306, it is determined that a RAID data movement operation is required, the method 300 proceeds to block 308 where the bifurcated bus width modification subsystem retrieves a bifurcated bus width for each respective bifurcated bus provided by a switch device to transfer data between each storage device and a root port in a primary processing system. In an embodiment, at decision block 306, the analysis of the respective storage device health information retrieved from each of the NVMe storage devices 210*a*-210*d* and 212*a*-212*b* identifies an unavailability or relatively imminent unavailability of one of those NVMe storage devices, a storage capacity expansion of the first or second RAID storage system, and/or any other issue that requires a RAID data movement operation, and the method 300 proceeds to block 308.

Figure 5B:
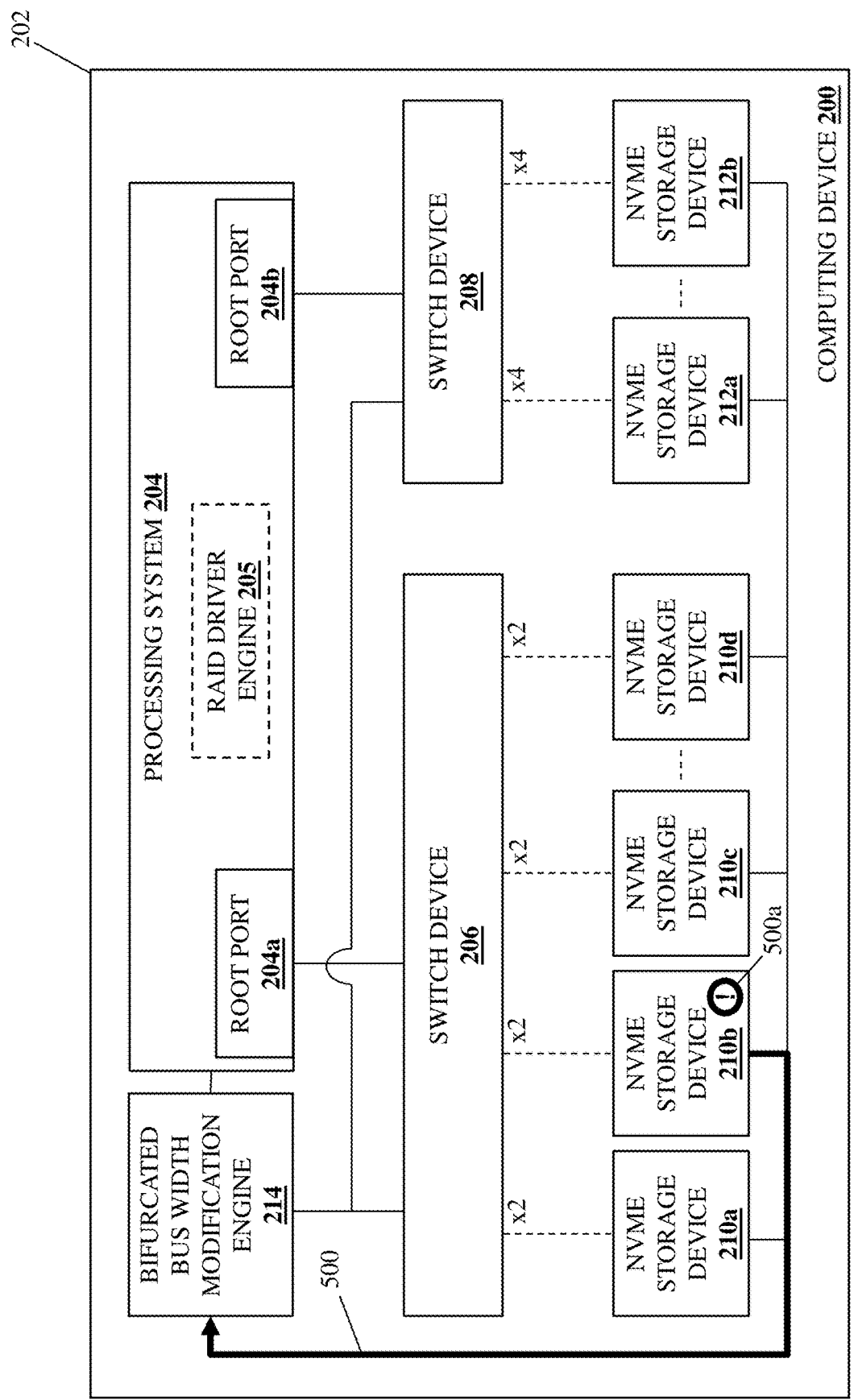
FIG. 5B is a schematic view illustrating an embodiment of the computing device of FIG. 2 operating during the method of FIG. 3.

With reference to the specific embodiment illustrated in FIG. 5B, the RAID storage system monitoring operations 500 performed at decision block 306 as described above may result in the identification that the NVMe storage device 210b is unavailable (as indicated by element 500b in FIG. 5B). For example, the NVMe storage device 210b may have failed or have otherwise become unavailable such that the data stored thereon is unavailable, and that failure/unavailability may be detected at decision block 306 based on the analysis of the storage device health information retrieved from the NVMe storage device 210b at block 304 (i.e., any storage device health information that indicates that the NVMe storage device 210b has failed or is unavailable, that the data stored on the NVMe storage device is unavailable, etc.).

In another example, the NVMe storage device 210b be operating such that the data stored thereon is available, and the RAID storage system monitoring operations 500 performed at decision block 306 as described above may result in the identification that the NVMe storage device 210b is or is relatively likely to be unavailable within some threshold time period (a "relatively imminent unavailability" that may also be indicated by element 500a in FIG. 5B). For example, the relatively imminent unavailability of the NVMe storage device 210b may be detected at decision block 306 based on the analysis of the storage device health information retrieved from the NVMe storage device 210b at block 304 and a determination that storage device health information exceeds one or more thresholds that are indicative of an imminent storage device unavailability (i.e., any storage device health information threshold(s) that are indicative that the NVMe storage device 210b is likely to fail or become unavailable, that the data stored on the NVMe storage device 210b is likely to become unavailable, etc.). As will be appreciated by one of skill in the art in possession of the present disclosure, the relatively imminent unavailability of the NVMe storage device 210b may be an unavailability predicted to occur within a default time period, a user-configurable time period, and/or any time period that may be based on data protection policies, and amount of data loss risk a user is willing to accept, and/or any other factors that would be apparent to one of skill in the art in possession of the present disclosure.

Figure 6:
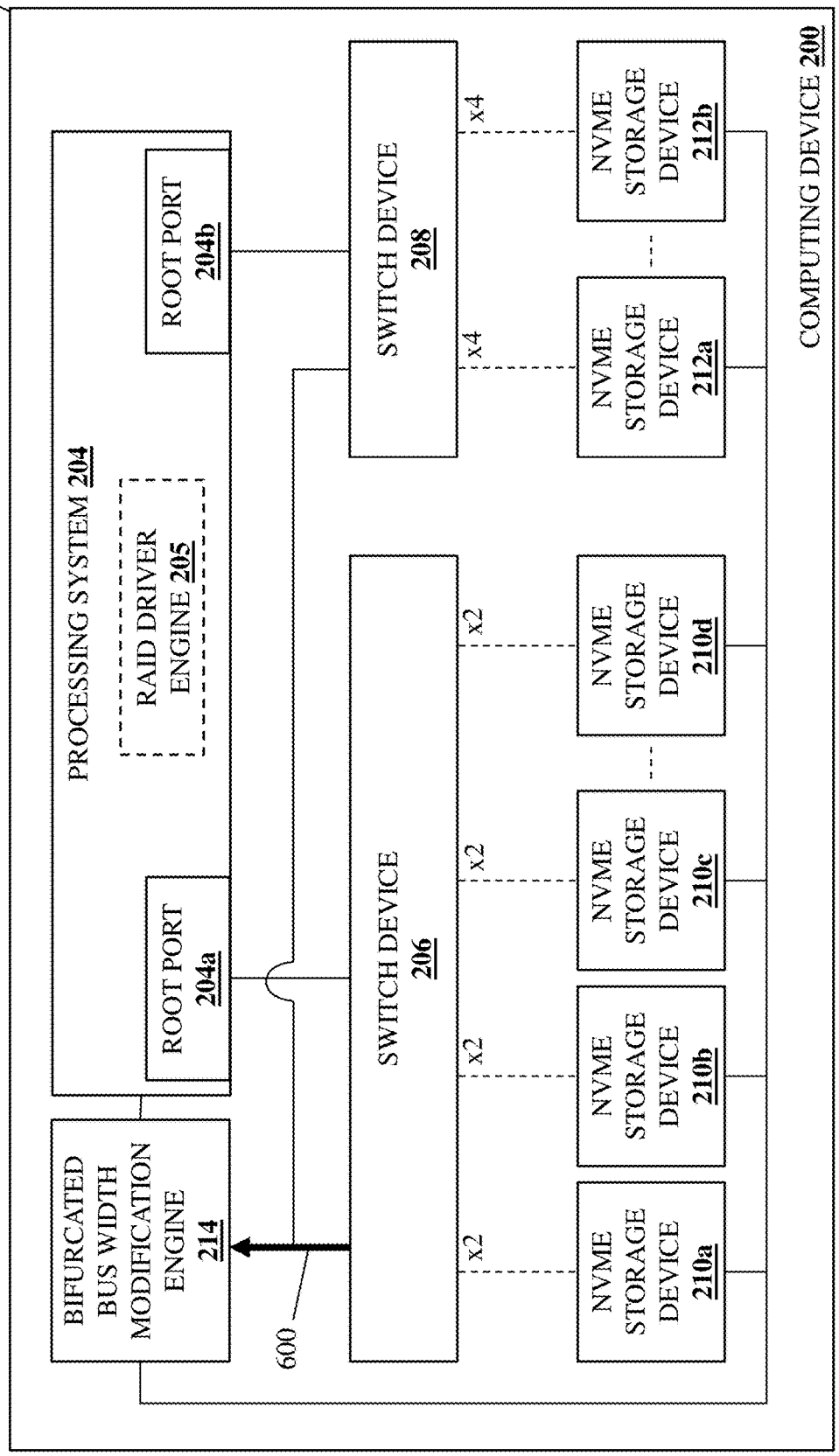
FIG. 6 is a schematic view illustrating an embodiment of the computing device of FIG. 2 operating during the method of FIG. 3.

With reference to FIG. 6, in an embodiment of block 308 and in response to determining that the RAID data movement operation is required for the first RAID storage system provided by the NVMe storage devices 210a-210d, the bifurcated bus width modification engine 214 may perform bifurcated bus width retrieval operations 600 that include retrieving a bifurcated bus width for each respective bifurcated bus provided by the switch device 206 to transfer data between each of the NVMe storage devices 210a-210d and the root port 204a in the processing system 204. As such, continuing with the example provided above, at block 308 the bifurcated bus width modification engine 214 may retrieve the "x2" bifurcated bus width for each respective bifurcated bus provided by the switch device 206 to transfer data between each of the NVMe storage devices 210a-210d and the root port 204a in the processing system 204, and those "x2" bifurcated bus widths may be retrieved using any of a variety of bifurcated bus width identification techniques that would be apparent to one of skill in the art in possession of the present disclosure.

Figure 7:
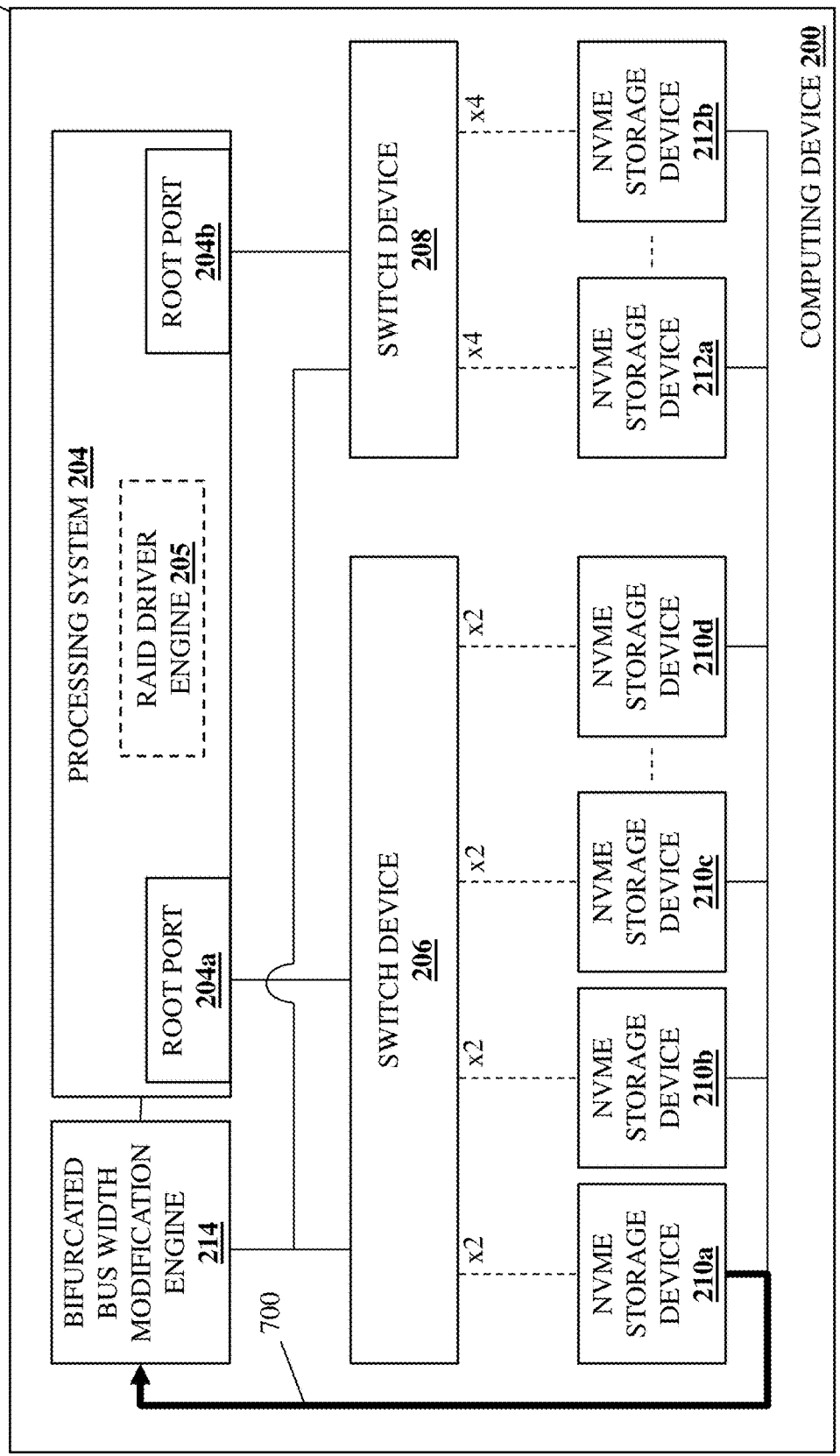
FIG. 7 is a schematic view illustrating an embodiment of the computing device of FIG. 2 operating during the method of FIG. 3.

The method 300 then proceeds to block 310 where the bifurcated bus width modification subsystem identifies a storage device to which data will be written as part of the RAID data movement operation. With reference to FIG. 7, in an embodiment of block 310, the bifurcated bus width modification engine 214 may perform data-receiving storage device identification operations 700 that include identifying the NVMe storage device 210a to which data will be written to as part of the RAID data movement operations that were determined to be required at decision block 306. In this specific example, the NVMe storage device 210a is provided as a "hot spare" storage device for the first RAID storage system provided by the NVMe storage devices 210a-210d, and one of skill in the art in possession of the present disclosure will appreciate how such "hot spare" storage devices may be reserved for use during the RAID data rebuild operations or RAID data copy operations described below (i.e., the "hot spare" storage device is not used to store data during the provisioning of its RAID storage system until another storage device that provides that RAID storage system becomes unavailable or will imminently become unavailable, the storage capacity of that RAID storage system is being expanded, etc.).

However, one of skill in the art in possession of the present disclosure will appreciate how a variety of storage devices to which data will be written may be identified at block 310 while remaining within the scope of the present disclosure as well. For example, an NVMe storage device (which operates similarly as the NVMe storage device 210a discussed below) may be connected to the switch device 206 (e.g., by a network administrator or other user) in response to detecting the unavailability of the NVMe storage device 210b, determining that the NVMe storage device 210b will imminently become unavailable, as part of OCE operations, etc., and may be identified at block 310 as part of the data-receiving storage device identification operations 700 using any of a variety of storage device identification techniques that would be apparent to one of skill in the art in possession of the present disclosure.

The method 300 then proceeds to block 312 where the bifurcated bus width modification subsystem modifies a bifurcated bus width of a bifurcated bus provided by the switch device to transfer data between at least one storage device and the root port. In this first example of block 312, the RAID data movement operation identified at block 306 is a data rebuild operation that uses data on the available NVMe storage devices 210c-210d to rebuild the unavailable data (which is stored in the unavailable NVMe storage device 210b) on the NVMe storage device 210a.

Figure 8A:
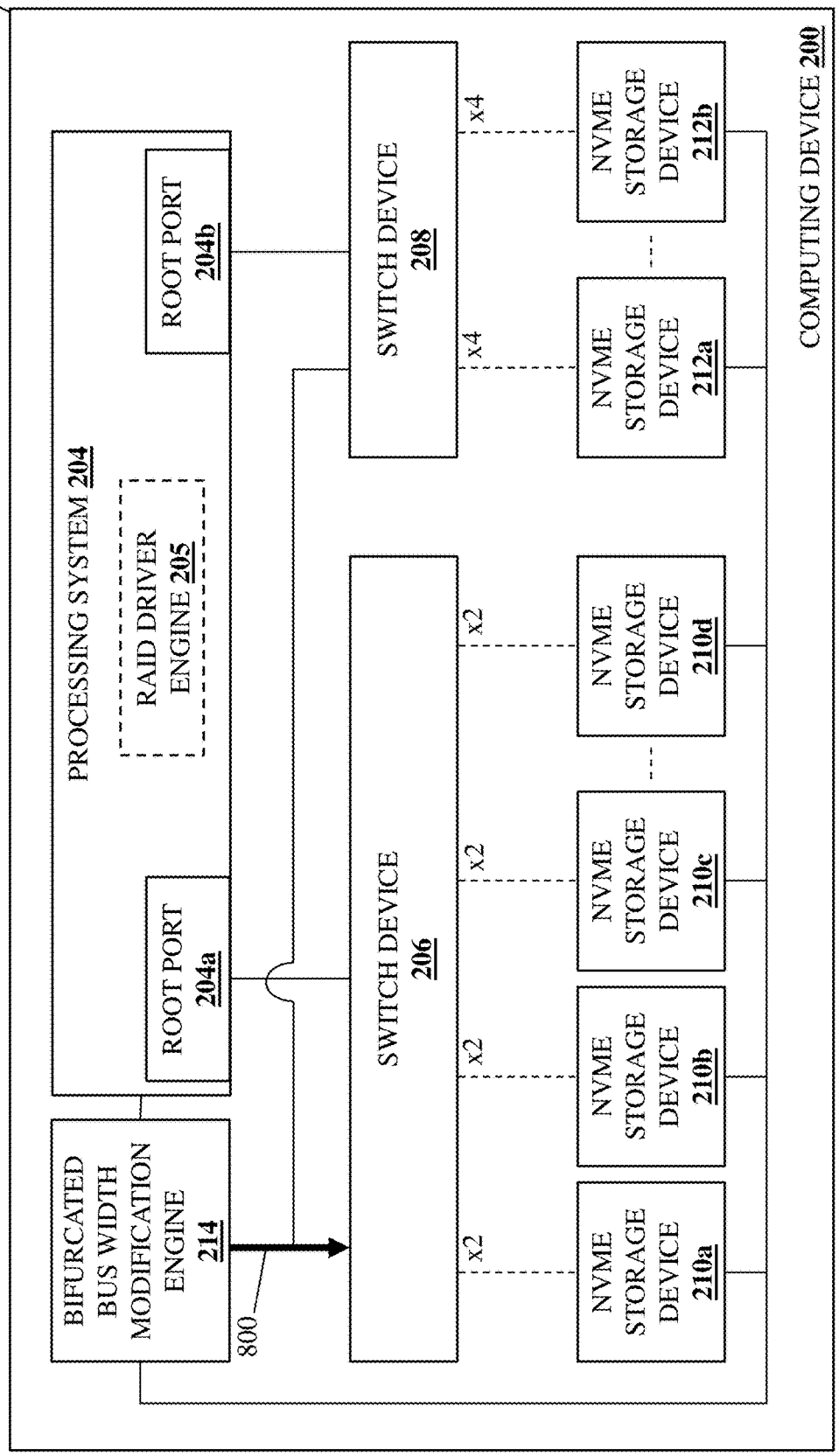
FIG. 8A is a schematic view illustrating an embodiment of the computing device of FIG. 2 operating during the method of FIG. 3.
Figure 8B:
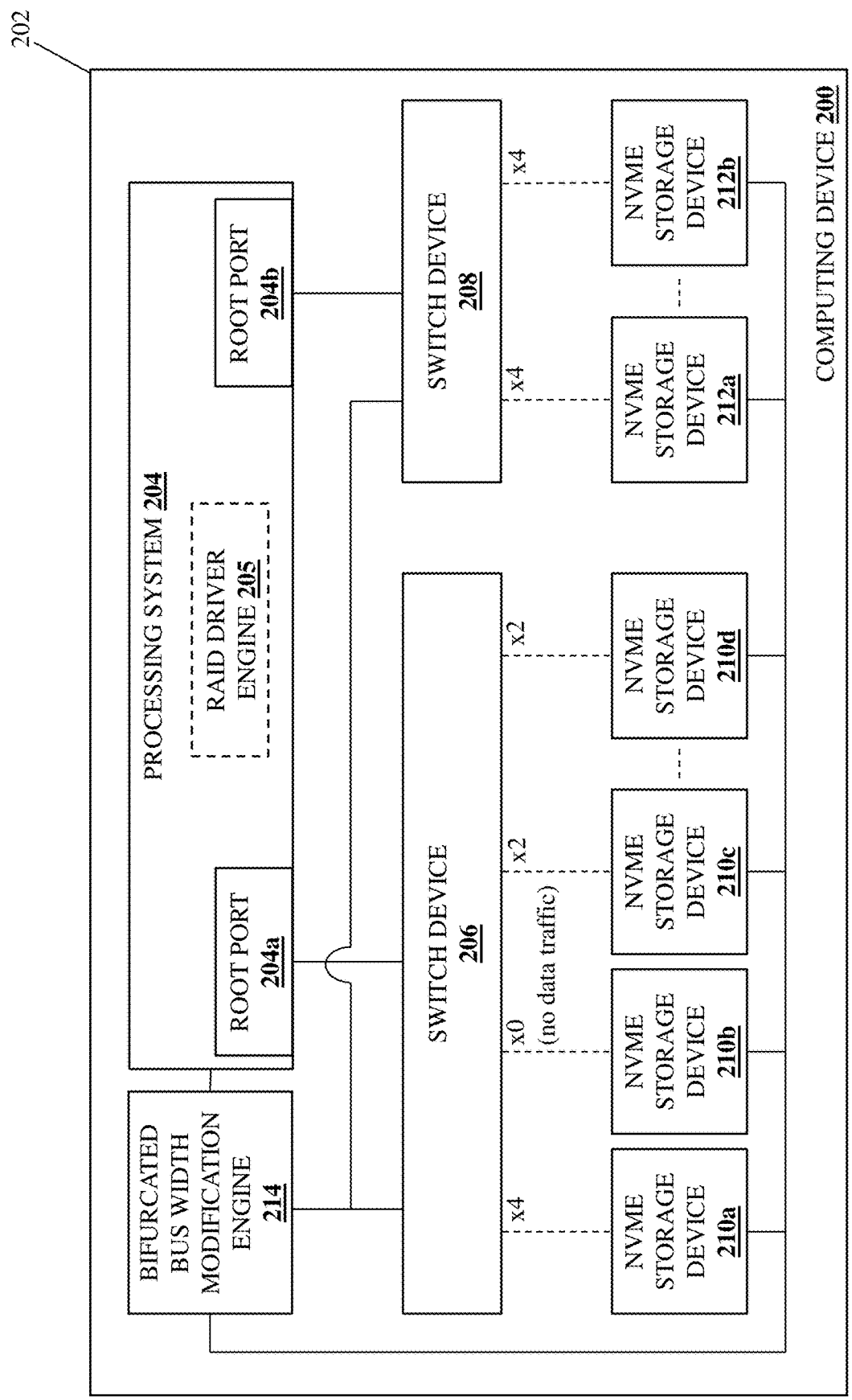
FIG. 8B is a schematic view illustrating an embodiment of the computing device of FIG. 2 operating during the method of FIG. 3.

With reference to FIG. 8A, in an embodiment of block 312, the bifurcated bus width modification engine 214 may perform bifurcated bus width modification operations 800 that include modifying the bifurcated bus width of one or more bifurcated bus(es) provided by the switch device 206 to transfer data between respective NVMe storage device(s) 210a-210d and the root port 204a. In different examples, the bifurcated bus width modification operations 800 may include the bifurcated bus width modification engine 214 accessing and modifying switch bifurcation bus register(s) in the switch device 206, generating and transmitting bifurcated bus width modification instruction(s) that are configured to cause the switch device 206 to perform the bifurcated bus width modifications described below (e.g., with the switch device 206 entering a PCIe switch device "recovery mode" to perform those bifurcated bus width modifications), and/or utilizing any other bifurcated bus width modification techniques that would be apparent to one of skill in the art in possession of the present disclosure. In this first example of block 312, the bifurcated bus width modification operations 800 provide for an increase in the bifurcated bus width of the bifurcated bus provided by the switch device 206 to transfer data between the NVMe storage device 210a and the root port 204a (i.e., from "x2" to "x4" in the example illustrated in FIGS. 8A and 8B), and a decrease in the bifurcated bus width of the bifurcated bus provided by the switch device 206 to transfer data between the NVMe storage device 210b and the root port 204a (i.e., from "×2" to "×0" in the example illustrated in FIGS. 8A and 8B, and one of skill in the art in possession of the present disclosure will appreciate how the "×0" bus width described herein indicates that no data traffic is transmitted via that bus, rather than a PCIe "0" bus width).

As will be appreciated by one of skill in the art in possession of the present disclosure, in this specific example the initial bifurcation of the root port bus provided by the root port 204a utilizes all of its "×8" root port bus width to provide a respective "×2" bifurcated bus to each of the NVMe storage devices 210a-210d, and in order to increase the bifurcated bus width of the bifurcated bus provided to the NVMe storage device 210a to which data will be written as part of the RAID data movement operations from "×2" to "×4", the bifurcated bus width of the bifurcated bus provided to the NVMe storage device 210b that is unavailable is decreased from "×2" to "×0" (with the "×0" bus width described herein indicating that no data traffic is transmitted via that bus, rather than a PCIe "0" bus width). In some examples, the bifurcated bus width modification operations 800 may include the bifurcated bus width modification engine 214 performing each of the respective bifurcated bus width modifications described above. However, in other examples, the bifurcated bus width modification operations 800 may include the bifurcated bus width modification engine 214 requesting the switch device 206 provide a maximum bifurcated bus width for the bifurcated bus provided for the NVMe storage device 210a (e.g., "×4" in this example), with that request causing the switch device 206 to decrease the bifurcated bus width of the bifurcated bus provided for the NVMe storage device 210b (e.g., from "×2" to "×0" in this example, with the "×0" bus width described herein indicating that no data traffic is transmitted via that bus, rather than a PCIe "0" bus width) using any of a variety of techniques that would be apparent to one of skill in the art in possession of the present disclosure.

Figure 9A:
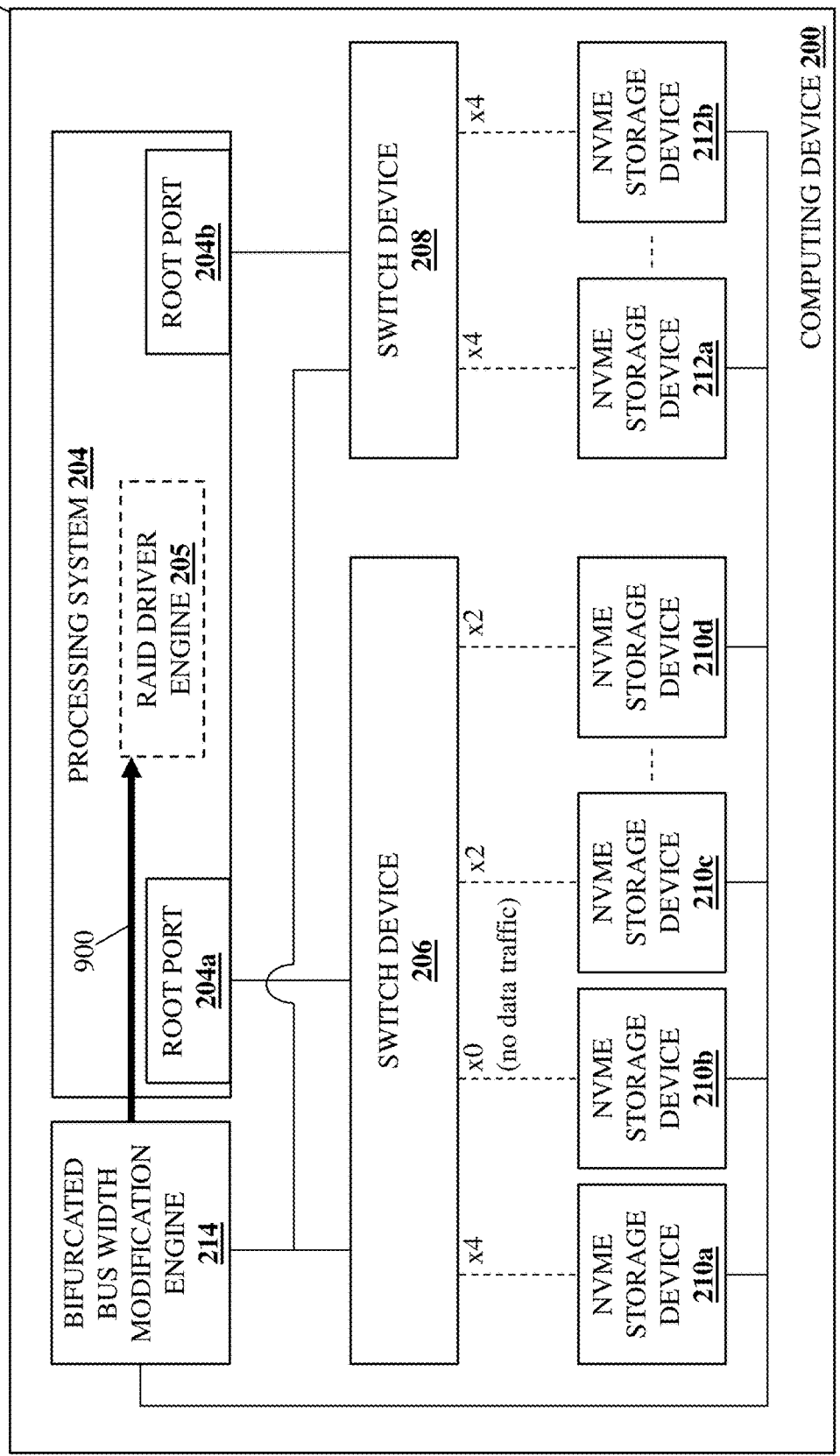
FIG. 9A is a schematic view illustrating an embodiment of the computing device of FIG. 2 operating during the method of FIG. 3.
Figure 9B:
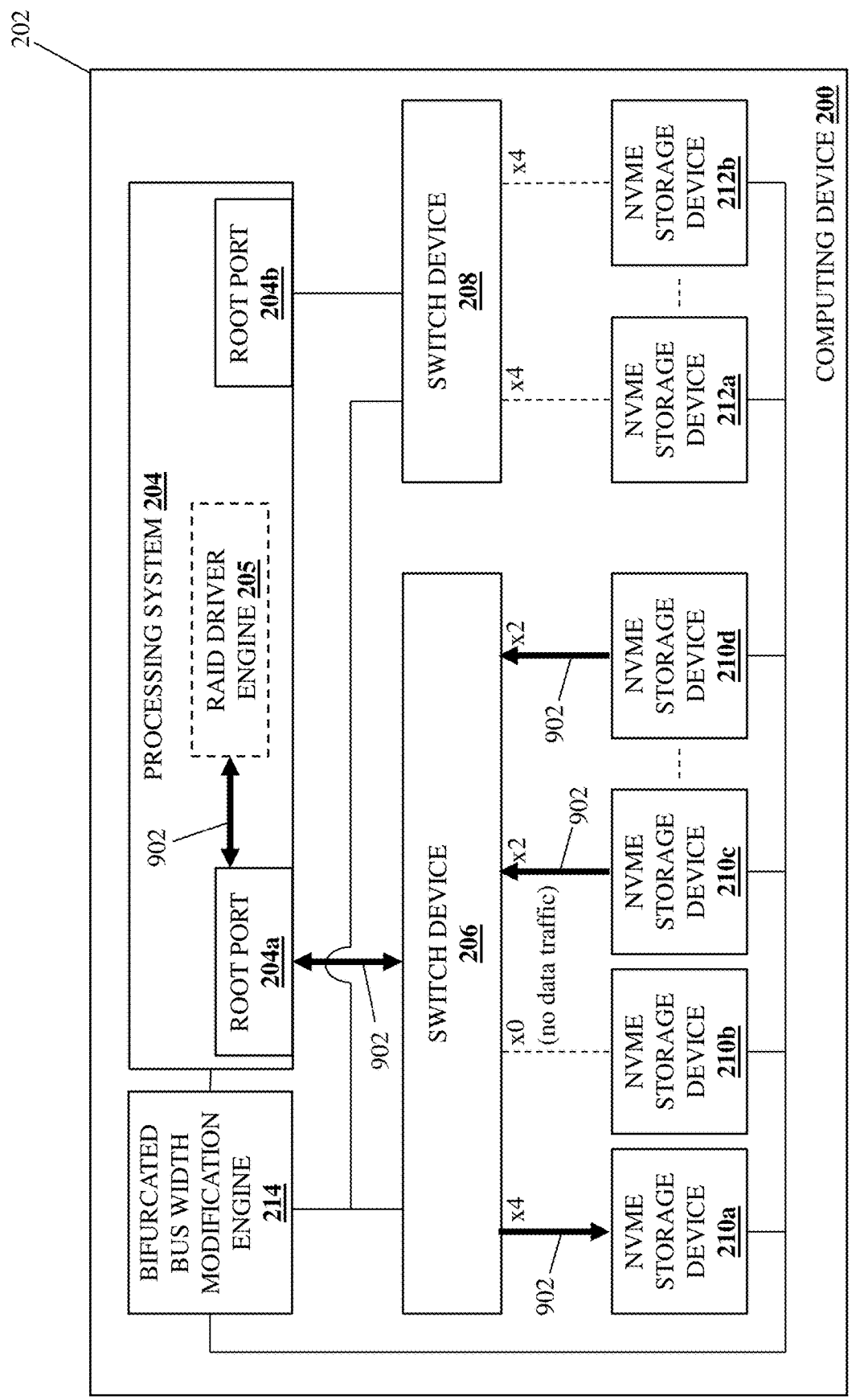
FIG. 9B is a schematic view illustrating an embodiment of the computing device of FIG. 2 operating during the method of FIG. 3.

Following the modification of the bifurcated bus width of the bifurcated bus(es) provided by the switch device 206 to transfer data between respective NVMe storage device(s) 210a-210d and the root port 204a, the RAID data movement operation may be performed. For example, with reference to FIG. 9A, the bifurcated bus width modification engine 214 may perform RAID data movement initiation operations 900 that include, in this example, instructing the RAID driver engine 205 provided by the processing system 204 to initiate the RAID data rebuild operations in which that RAID data movement will be performed. With reference to FIG. 9B, the RAID driver engine 205 may then perform RAID data movement operations 902 via the root port 204a and the switch device 206 using the NVMe storage devices 210a, 210c, and 210d, which one of skill in the art in possession of the present disclosure will recognize is illustrated as being performed as part of a RAID data rebuild operation that includes reading data from the NVMe storage devices 210c and 210d via the respective bifurcated bus provided for that NVMe storage device with the "×2" bifurcated bus width, using any of a variety of RAID data rebuild techniques known in the art with that data to "rebuild" the data that is stored on the unavailable NVMe storage device 210b, and writing that "rebuilt" data to the NVMe storage device 210a via the bifurcated bus provided for the NVMe storage device 210a with the "×4" bifurcated bus width.

As will be appreciated by one of skill in the art in possession of the present disclosure, the bifurcated bus width modification described above will allow the RAID data rebuild operation to be completed relatively quicker than if the bifurcated bus widths were not modified, with a bottleneck that results from relatively high-bus-bandwidth data write operations alleviated by increasing the bifurcated bus width of the bifurcated bus provided for the NVMe storage device 210a to which the "rebuilt" data is written. However, while a RAID data rebuild operation in which the data reads from the NVMe storage devices 210c and 210d do not significantly contribute to the time needed to perform that RAID data rebuild operation has been described (and that results in the bifurcated bus width modifications of the present disclosure being used to increase the bifurcated bus width of the bifurcated bus provided for the NVMe storage device 210a for use in performing the data writes that provide the significant contribution to the time needed to perform the RAID data rebuild operation), other data movement operations may call for the modification of the bifurcated bus width of bifurcated bus(es) used in data reads or other RAID data operations while remaining within the scope of the present disclosure as well.

The method 300 then proceeds to decision block 314 where it is determined whether the RAID data movement operation is completed. As will be appreciated by one of skill in the art in possession of the present disclosure, at decision block 314 the RAID data movement operations 902 (e.g., the RAID data rebuild operations illustrated in FIG. 9B) may be performed until they are completed, and as discussed below the RAID driver engine 205 may be configured to identify the completion of the RAID data movement operations 902 to the bifurcated bus width modification engine 214 upon the completion of those RAID data movement operations 902. As such, at decision block 314 and following the RAID data movement initiation operations 900, the bifurcated bus width modification engine 214 may monitor for the identification of the completion of the RAID data movement operations 902 from the RAID driver engine 205. If, at decision block 310, it is determined that the RAID data movement operation is not completed, the method 300 returns to decision block 314. As such, the method 300 may loop such that the bifurcated bus width modification engine 214 continues to monitor for the identification of the completion of the RAID data movement operations 902 from the RAID driver engine 205 until that identification is received.

Figure 9C:
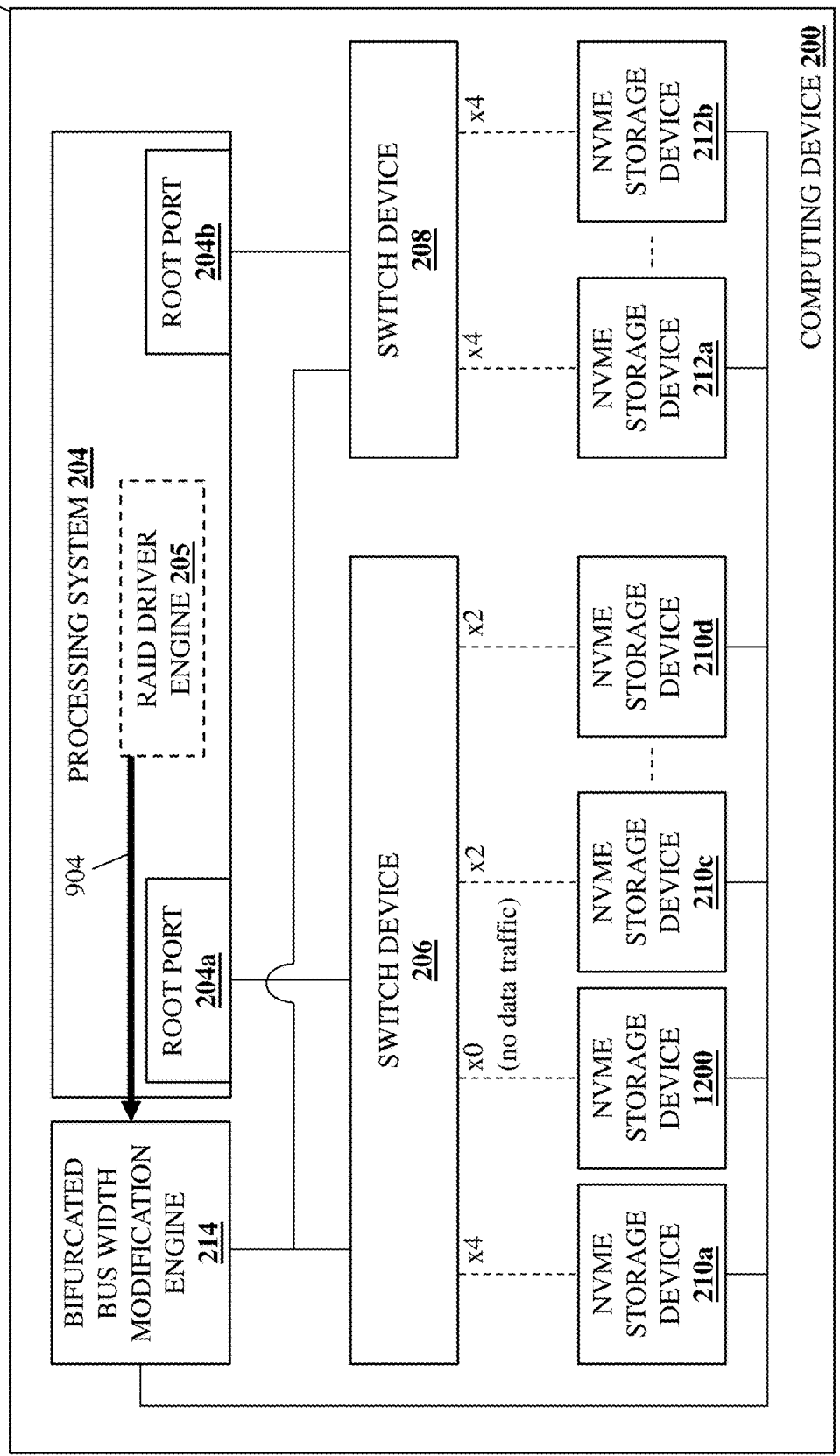
FIG. 9C is a schematic view illustrating an embodiment of the computing device of FIG. 2 operating during the method of FIG. 3.

If, at decision block 314, it is determined that the RAID data movement operation is completed, the method 300 proceeds to block 316 where the bifurcated bus width modification subsystem restores the bifurcated bus width of the bifurcated bus provided by the switch device to transfer data between the at least one storage device and the root port. With reference to FIG. 9C, in an embodiment of decision block 314 and in response to completing the RAID data movement operations 902, the RAID driver engine 205 may perform RAID data movement completion identification operations 904 that include generating a RAID data movement completion communication and transmitting that RAID data movement completion communication to the bifurcated bus width modification engine 214. Furthermore, FIG. 9C illustrates how the unavailable NVMe storage device 210b may be replaced by an NVMe storage device 1200 following the completion of the RAID data movement operations 902.

Figure 10A:
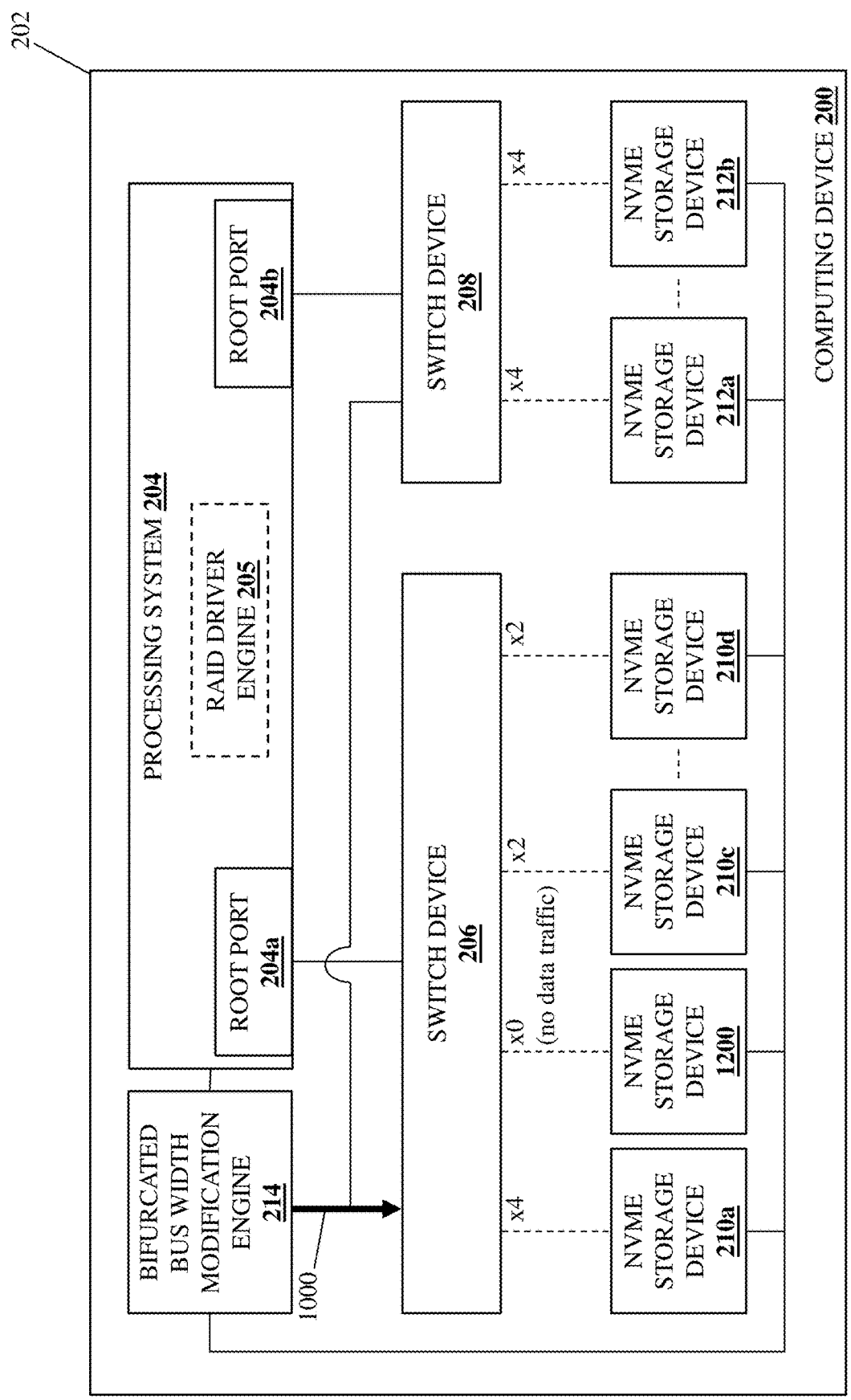
FIG. 10A is a schematic view illustrating an embodiment of the computing device of FIG. 2 operating during the method of FIG. 3.
Figure 10B:
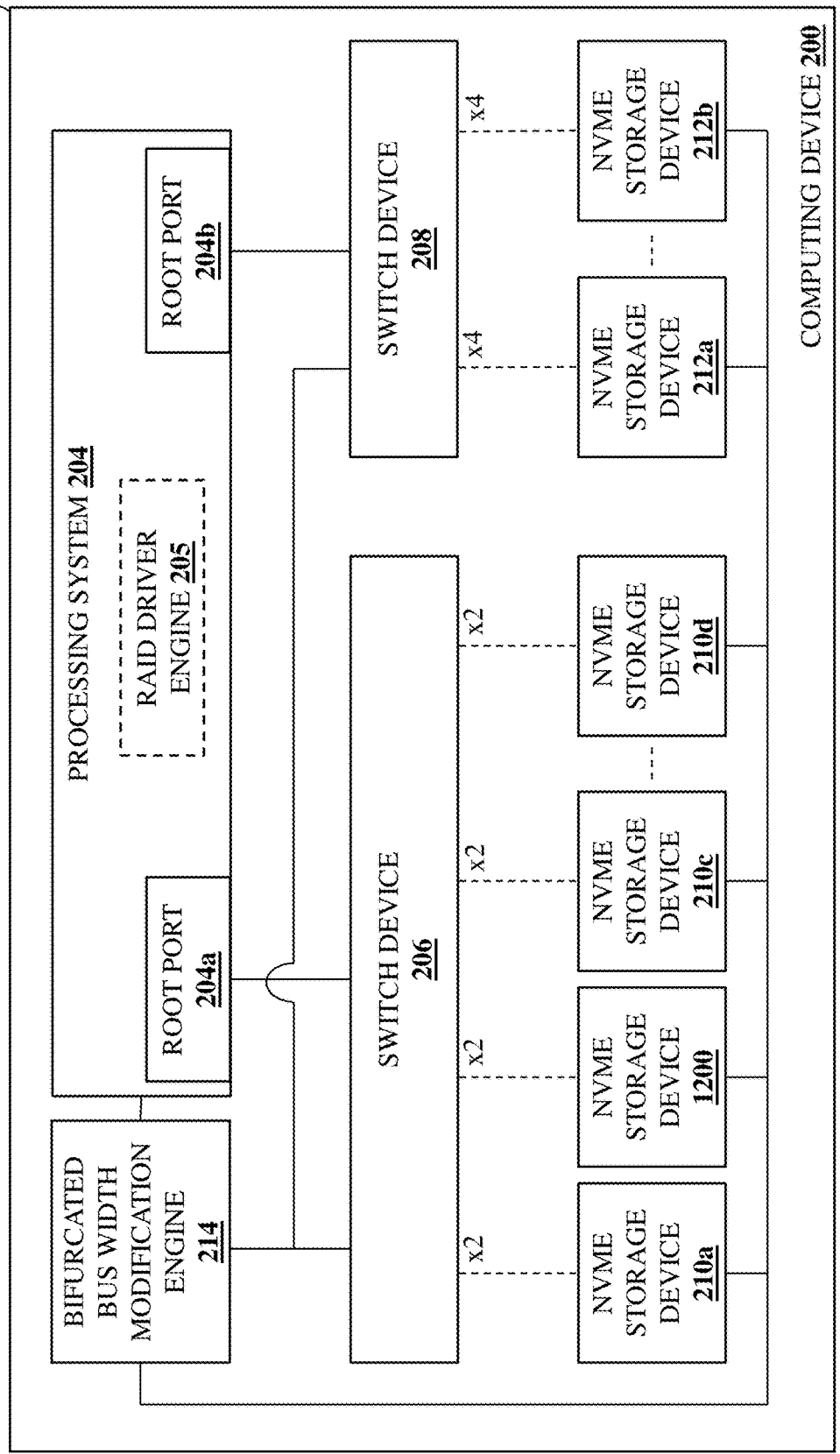
FIG. 10B is a schematic view illustrating an embodiment of the computing device of FIG. 2 operating during the method of FIG. 3.

With reference to FIGS. 10A and 10B, in response to receiving the RAID data movement completion communication, the bifurcated bus width modification engine 214 may perform bifurcated bus width restoration operations 1000 that include restoring the bifurcated bus width of the one or more bifurcated bus(es) that were modified at block 312 to that bifurcated bus width prior to the bifurcated bus width modification (e.g., restoring those bifurcated bus(es) to the default bifurcated bus width discussed above). Similarly as described above, the bifurcated bus width restoration operations 1000 may include the bifurcated bus width modification engine 214 accessing and modifying switch bifurcation bus register(s) in the switch device 206, generating and transmitting bifurcated bus width modification instruction(s) that are configured to cause the switch device 206 to perform the bifurcated bus width restoration described below (e.g., with the switch device 206 entering a PCIe switch device "recovery mode" to perform that bifurcated bus width restoration), and/or utilizing any other bifurcated bus width modification techniques that would be apparent to one of skill in the art in possession of the present disclosure.

With continued reference to FIG. 10B and in this first example of block 316, the bifurcated bus width modification operations 1000 provide for a decrease in the bifurcated bus width of the bifurcated bus provided by the switch device 206 to transfer data between the NVMe storage device 210a and the root port 204a (i.e., from "×4" back to the "×2"/default bifurcated bus width in the example illustrated in FIGS. 10A and 10B), and an increase in the bifurcated bus width of the bifurcated bus provided by the switch device 206 to transfer data between an NVMe storage device 1200 (which has been provided to replace the unavailable NVMe storage device 210b and has been connected to the port on the switch device 206 that provides that bifurcated bus) and the root port 204a (i.e., from "×0" back to the "×2"/default bifurcated bus width in the example illustrated in FIGS. 10A and 10B, with the "×0" bus width described herein indicating that no data traffic is transmitted via that bus, rather than a PCIe "0" bus width). In some examples, the bifurcated bus width modification operations 1000 may include the bifurcated bus width modification engine 214 performing each of the respective bifurcated bus width modifications described above. However, in other examples, the bifurcated bus width modification operations 1000 may include the bifurcated bus width modification engine 214 requesting the switch device 206 provide the default bifurcated bus width for each of the bifurcated buses provided for the NVMe storage devices 210a, 1200, 210c, and 210d (e.g., "×2" in this example).

The method 300 then returns to block 304. As such, the method 300 may loop to perform the bifurcated bus width modifications and enhance the data movement operations of RAID storage systems similarly as described above. Furthermore, while a specific example of block 312 has been illustrated and described, one of skill in the art in possession of the present disclosure will appreciate how a variety of modifications may be made to the bifurcated bus width of respective bifurcated bus(es) provided by a switch device to transfer data between storage device(s) and a root port.

Figure 11A:
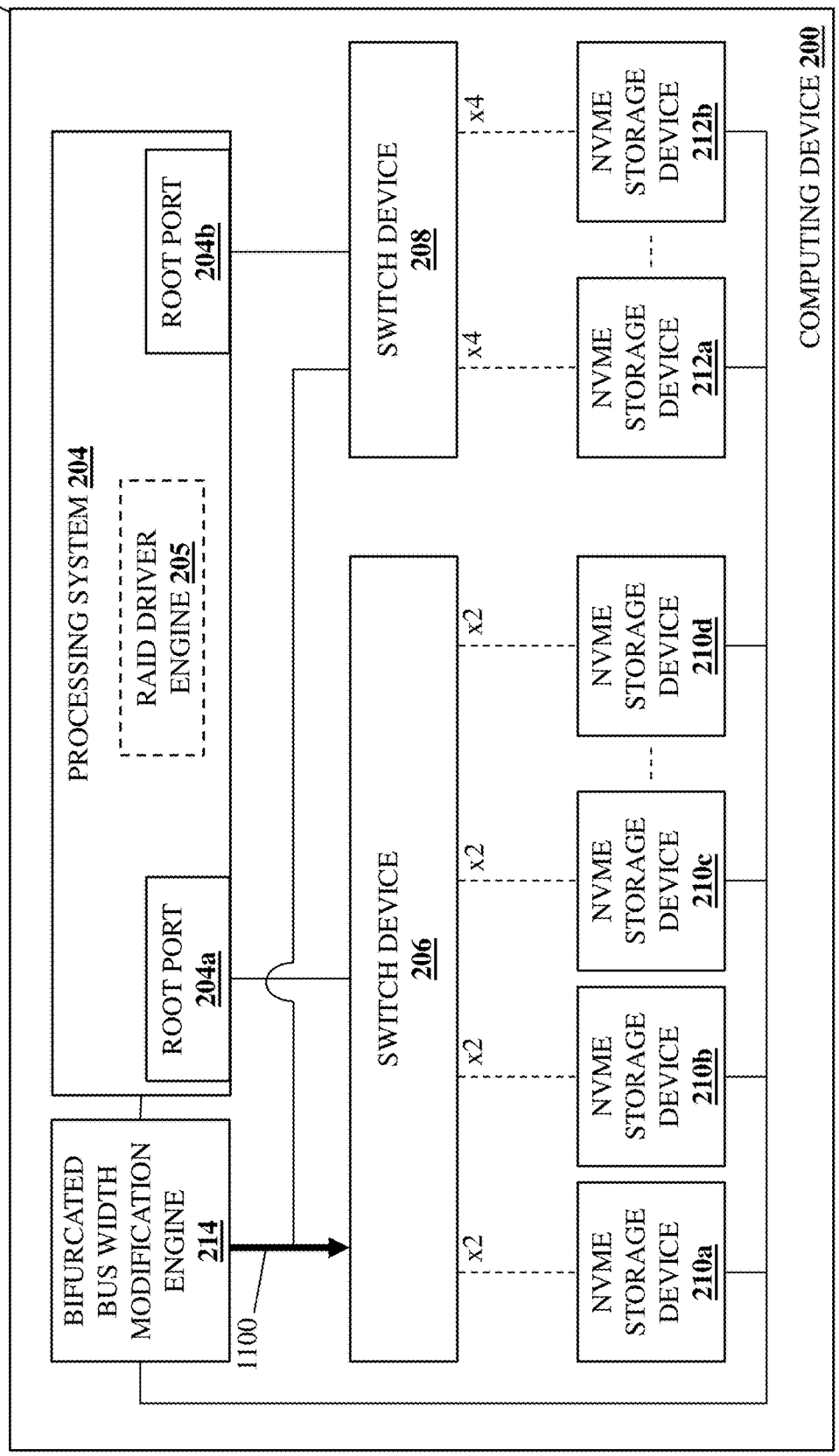
FIG. 11A is a schematic view illustrating an embodiment of the computing device of FIG. 2 operating during the method of FIG. 3.
Figure 11B:
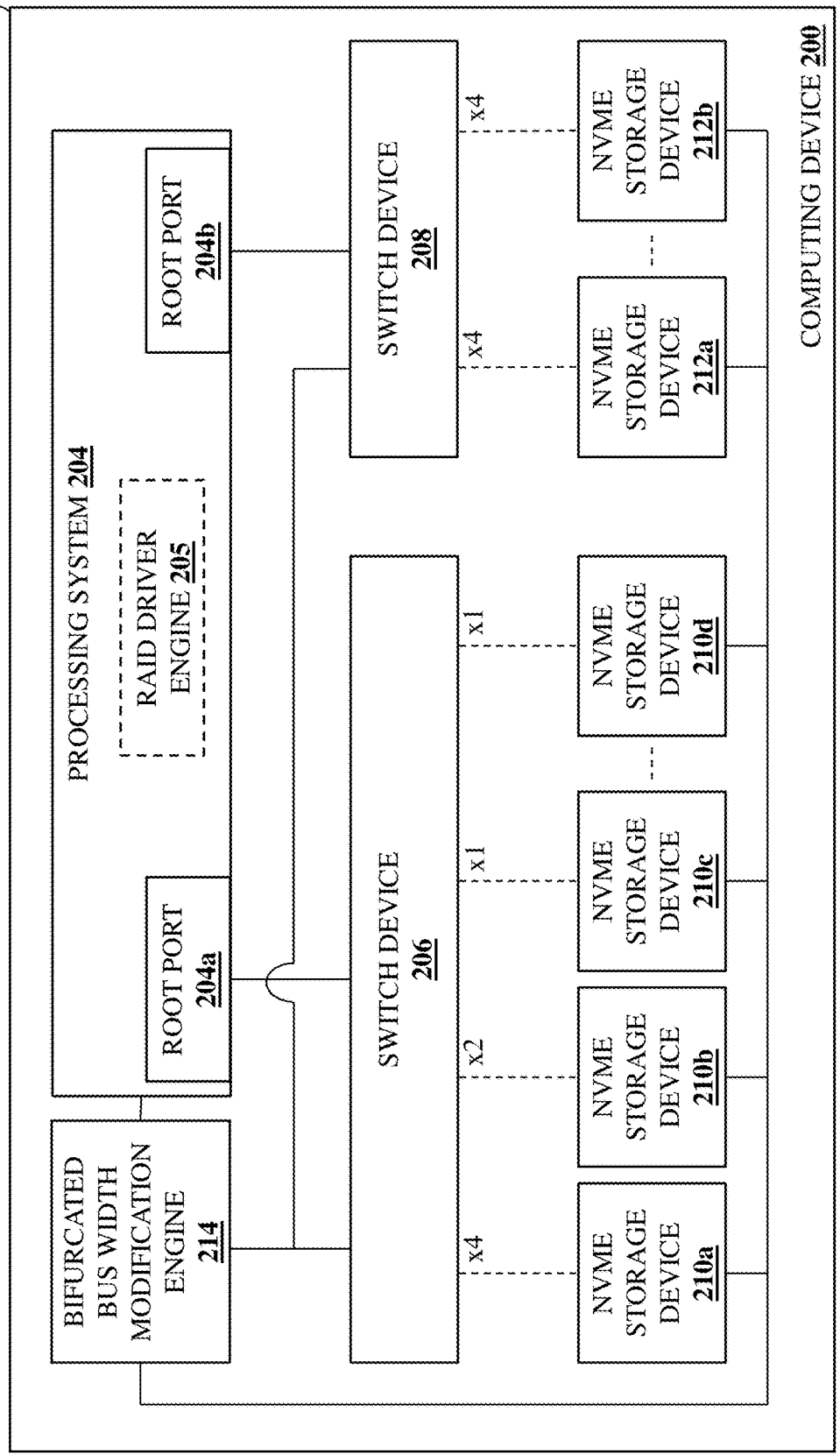
FIG. 11B is a schematic view illustrating an embodiment of the computing device of FIG. 2 operating during the method of FIG. 3.

To provide a second example of block 312, the RAID data movement operation identified at block 306 is a data copy operation that copies data to the NVMe storage device 210a from the NVMe storage devices 210b that will be relatively imminently unavailable. With reference to FIG. 11A, in an embodiment of block 312 and similarly as described above, the bifurcated bus width modification engine 214 may perform bifurcated bus width modification operations 1100 that include modifying the bifurcated bus width of one or more bifurcated bus(es) provided by the switch device 206 to transfer data between respective NVMe storage device(s) 210a-210d and the root port 204a. As such, in this second example of block 312, the bifurcated bus width modification operations 1100 provide for an increase in the bifurcated bus width of the bifurcated bus provided by the switch device 206 to transfer data between the NVMe storage device 210a and the root port 204a (i.e., from "×2" to "×4" in the example illustrated in FIGS. 8A and 8B), and a decrease in the bifurcated bus width of the bifurcated buses provided by the switch device 206 to transfer data between each of the NVMe storage devices 210c and 210d and the root port 204a (i.e., from "×2" to "×1" in the example illustrated in FIGS. 11A and 11B).

Similarly as described above, in this specific example the initial bifurcation of the root port bus provided by the root port 204a utilizes all of its "×8" root port bus width to provide a respective "×2" bifurcated bus to each of the NVMe storage devices 210a-210d, and in order to increase the bifurcated bus width of the bifurcated bus provided to the NVMe storage device 210a to which data will be written as part of the RAID data movement operations from "×2" to "×4", the bifurcated bus width of the bifurcated buses provided to each of the NVMe storage devices 210c and 210d that will not be used in the RAID data movement operations are decreased from "×2" to "×1". Similarly as described above, in some examples the bifurcated bus width modification operations 1100 may include the bifurcated bus width modification engine 214 performing each of the respective bifurcated bus width modifications described above, while in other examples the bifurcated bus width modification operations 1100 may include the bifurcated bus width modification engine 214 requesting the switch device 206 provide a maximum bifurcated bus width for the bifurcated bus provided for the NVMe storage device 210a (e.g., "×4" in this example), and that request causing the switch device 206 to decrease the bifurcated bus width of the bifurcated buses provided for each of the NVMe storage devices 210c and 210d (e.g., from "×2" to "×1" in this example) using any of a variety of techniques that would be apparent to one of skill in the art in possession of the present disclosure.

Figure 12A:
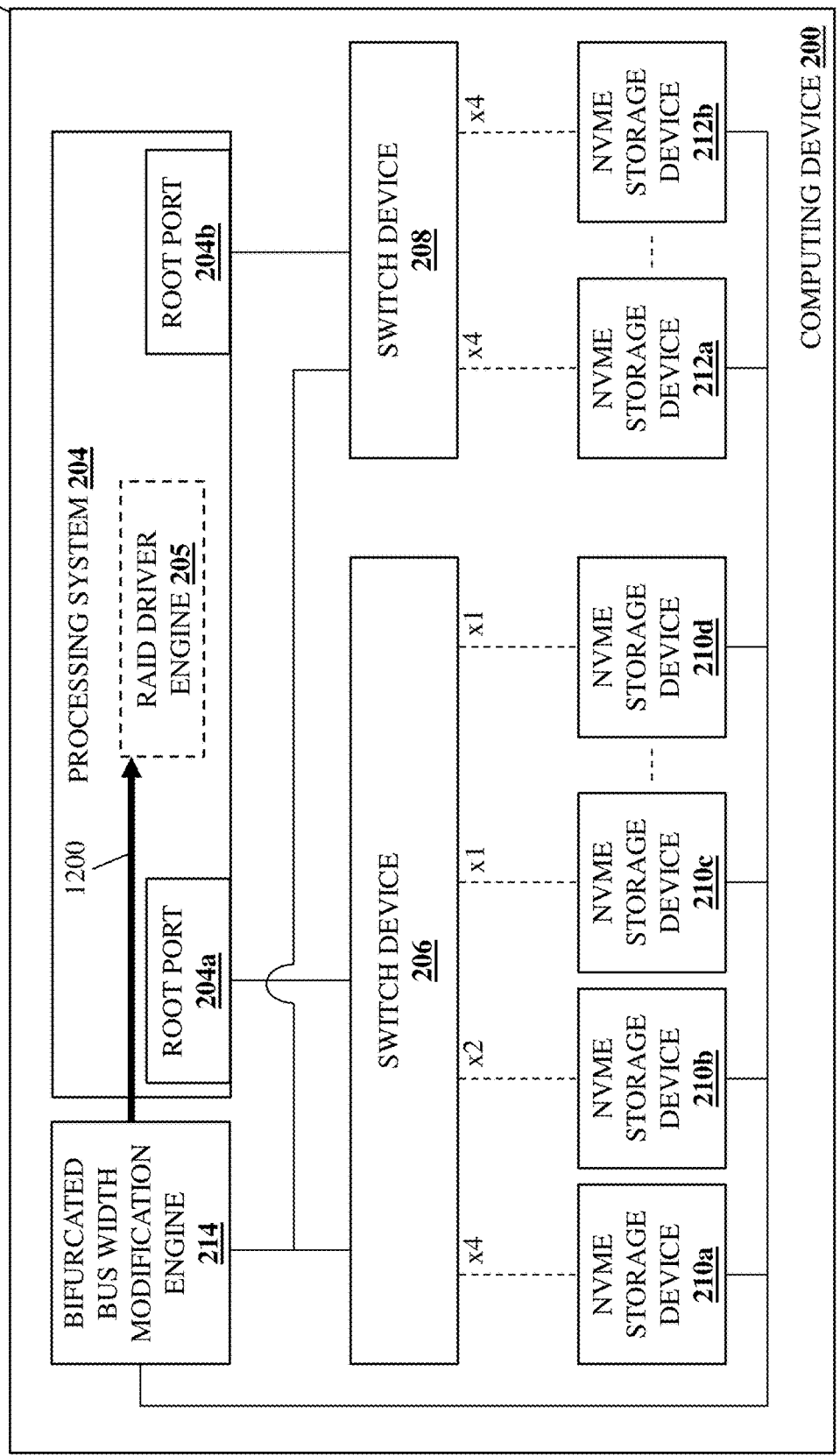
FIG. 12A is a schematic view illustrating an embodiment of the computing device of FIG. 2 operating during the method of FIG. 3.
Figure 12B:
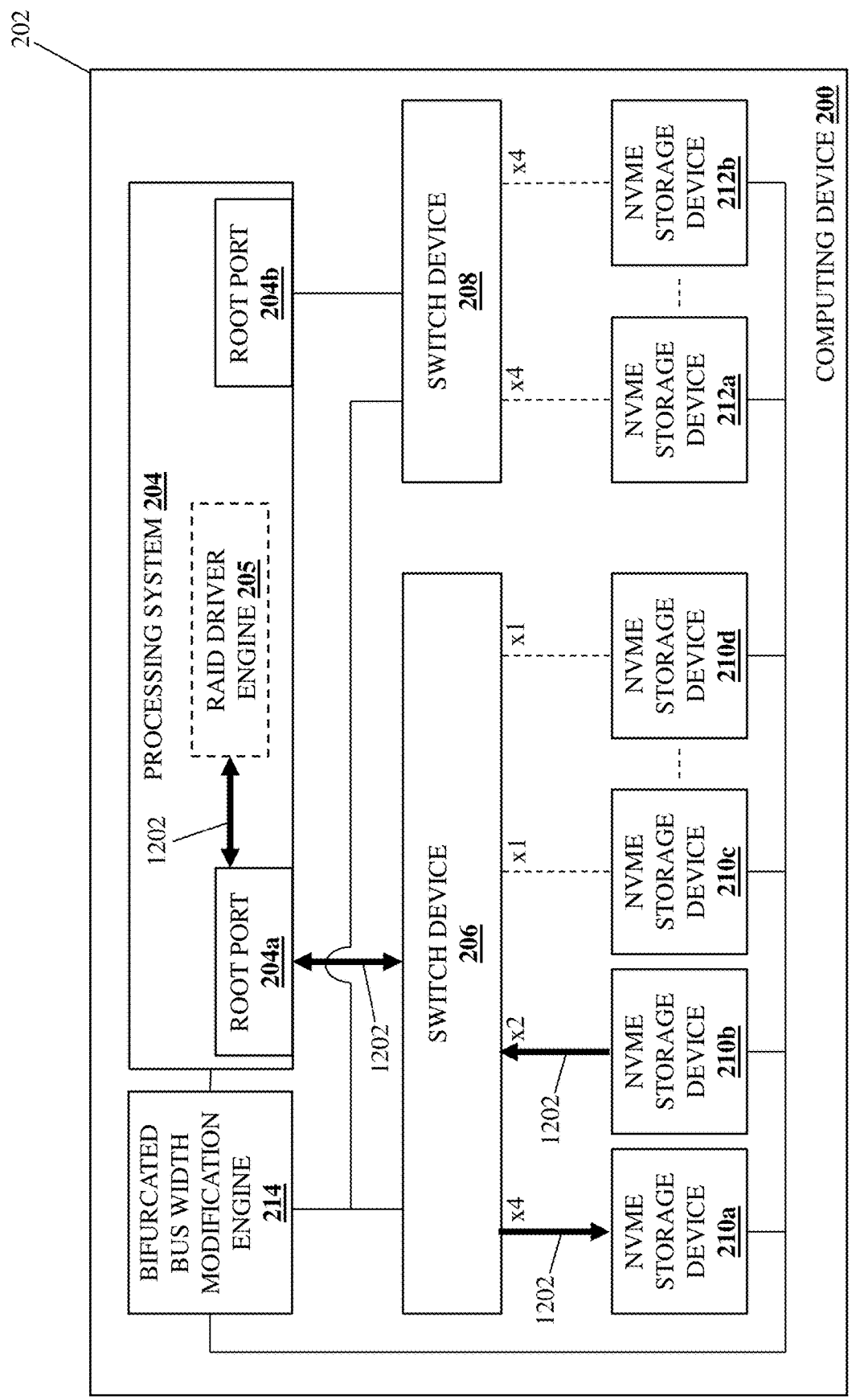
FIG. 12B is a schematic view illustrating an embodiment of the computing device of FIG. 2 operating during the method of FIG. 3.

Following the modification of the bifurcated bus width of the bifurcated bus(es) provided by the switch device 206 to transfer data between respective NVMe storage device(s) 210a-210d and the root port 204a, the RAID data movement operation may be performed. For example, with reference to FIG. 12A, the bifurcated bus width modification engine 214 may perform RAID data movement initiation operations 1200 that include instructing the RAID driver engine 205 provided by the processing system 204 to initiate the RAID data copy operations that include the RAID data movement. With reference to FIG. 12B, the RAID driver engine 205 may then perform RAID data movement operations 1202 via the root port 204a and the switch device 206 using the NVMe storage devices 210a and 210b, which one of skill in the art in possession of the present disclosure will recognize is illustrated as providing a RAID data copy operation that includes reading data from the NVMe storage device 210b via the bifurcated bus provided for the NVMe storage device 210b with the "×2" bifurcated bus width, and writing that data to the NVMe storage device 210a via the bifurcated bus provided for the NVMe storage device 210a with the "×4" bifurcated bus width.

As will be appreciated by one of skill in the art in possession of the present disclosure, the bifurcated bus width modification described above will allow the RAID data copy operation to be completed relatively quicker than if the bifurcated bus widths were not modified, with a bottleneck that results from relatively high-bus-bandwidth data write operations alleviated by increasing the bifurcated bus width of the bifurcated bus provided for the NVMe storage device 210a to which the data is written. However, while a RAID data copy operation in which the data reads from the NVMe storage device 210b do not significantly contribute to the time needed to perform the RAID data copy operation has been described (and that results in the bifurcated bus width modifications of the present disclosure being used to increase the bifurcated bus width of the bifurcated bus provided for the NVMe storage device 210a for use in performing the data writes that provide the significant contribution to the time needed to perform the RAID data rebuild operation), other data movement operations may call for the modification of the bifurcated bus width of bifurcated bus(es) used in data reads or other RAID data operations while remaining within the scope of the present disclosure as well.

The method 300 then proceeds to decision block 314 where it is determined whether the RAID data movement operation is completed. Similarly as discussed above, at decision block 314 the RAID data movement operations 1202 (e.g., the RAID data copy operations illustrated in FIG. 12B) may be performed until they are completed, and as discussed below the RAID driver engine 205 may be configured to identify the completion of the RAID data movement operations 1202 to the bifurcated bus width modification engine 214 upon the completion of those RAID data movement operations 1202. As such, at decision block 314 and following the RAID data movement initiation operations 1200, the bifurcated bus width modification engine 214 may monitor for the identification of the completion of the RAID data movement operations 1202 from the RAID driver engine 205. If, at decision block 310, it is determined that the RAID data movement operation is not completed, the method 300 returns to decision block 314. As such, the method 300 may loop such that the bifurcated bus width modification engine 214 continues to monitor for the identification of the completion of the RAID data movement operations 1202 from the RAID driver engine 205 until that identification is received.

Figure 12C:
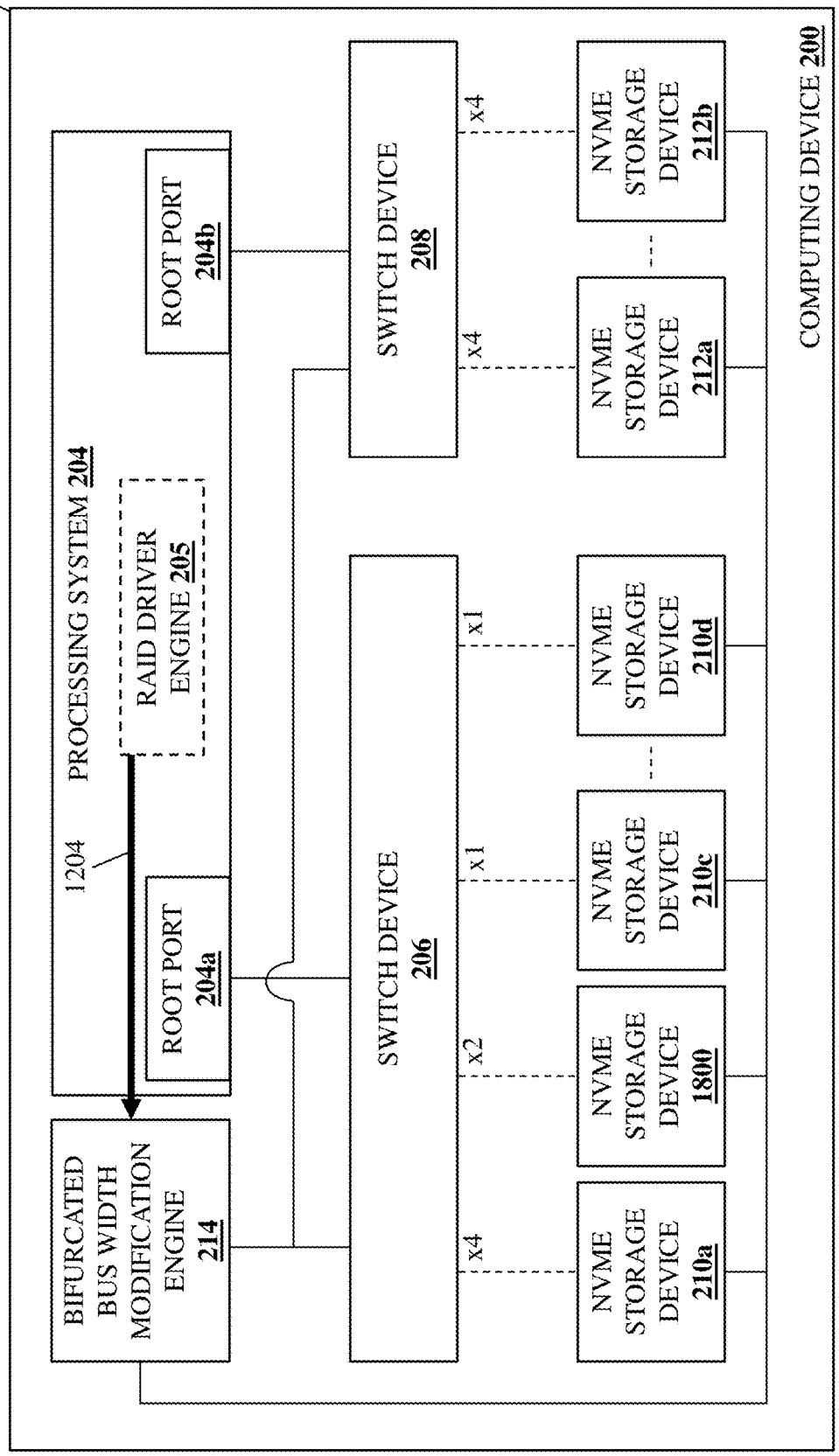
FIG. 12C is a schematic view illustrating an embodiment of the computing device of FIG. 2 operating during the method of FIG. 3.

If, at decision block 314, it is determined that the RAID data movement operation is completed, the method 300 proceeds to block 316 where the bifurcated bus width modification subsystem decreases the bifurcated bus width of the first bifurcated bus provided by the switch device to transfer data between the first storage device and the root port. With reference to FIG. 12C, in an embodiment of decision block 314 and in response to completing the RAID data movement operations 1202, the RAID driver engine 205 may perform RAID data movement completion identification operations 1204 that include generating a RAID data movement completion communication and transmitting that RAID data movement completion communication to the bifurcated bus width modification engine 214. Furthermore, FIG. 12C illustrates how the NVMe storage device 210b may be replaced by an NVMe storage device 1800 following the completion of the RAID data movement operations 1202, with the NVMe storage device 1800 connected to the bifurcated bus having the "×2" bifurcated bus width that was previously provided by the switch device 206 to transfer data between the NVMe storage device 210b and the root port 204a.

Figure 13A:
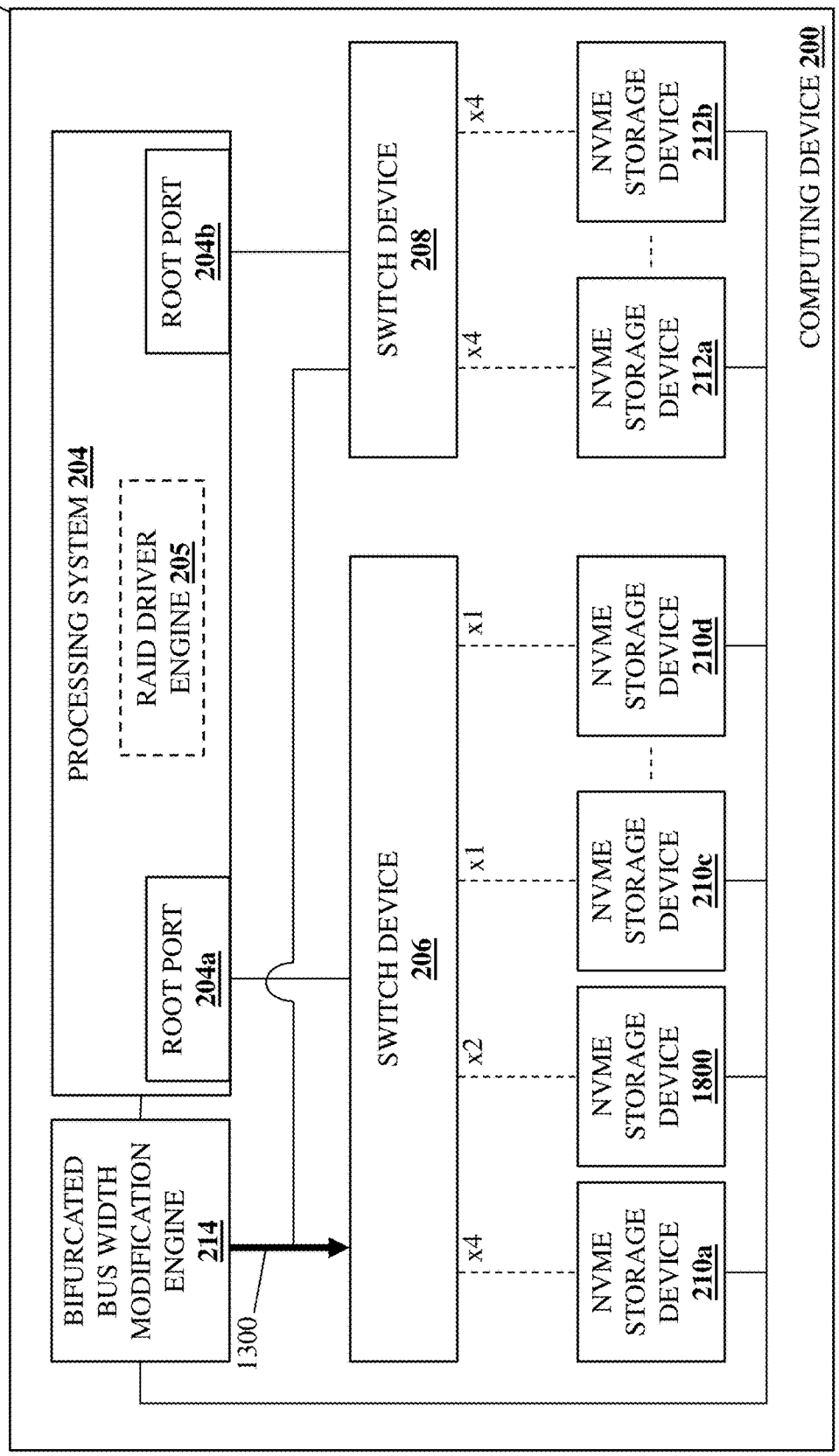
FIG. 13A is a schematic view illustrating an embodiment of the computing device of FIG. 2 operating during the method of FIG. 3.
Figure 13B:
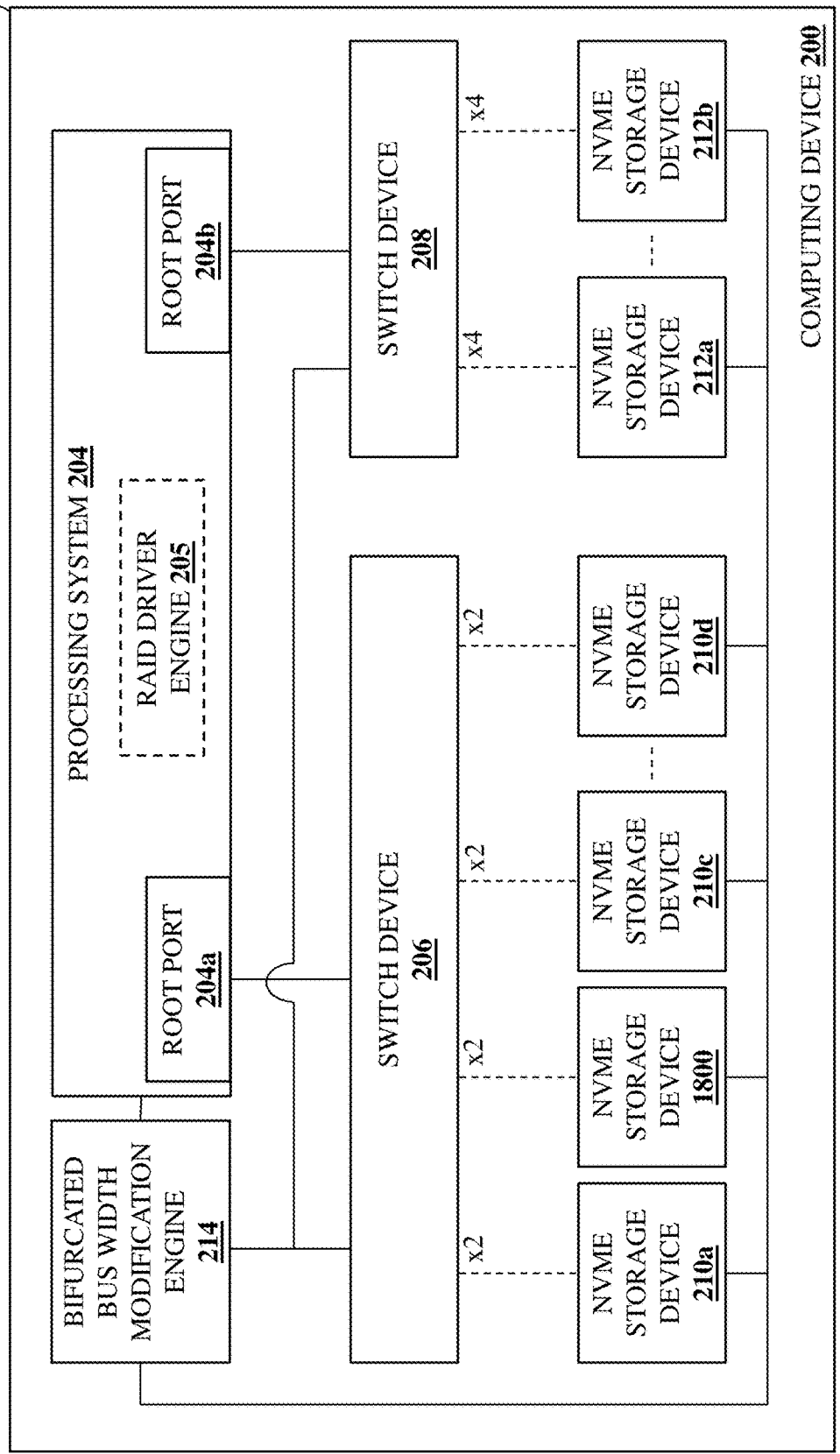
FIG. 13B is a schematic view illustrating an embodiment of the computing device of FIG. 2 operating during the method of FIG. 3.

With reference to FIGS. 13A and 13B, in response to receiving the RAID data movement completion communication, the bifurcated bus width modification engine 214 may perform bifurcated bus width restoration operations 1300 that include restoring the bifurcated bus width of the one or more bifurcated bus(es) that were modified at block 312 to that bifurcated bus width prior to the bifurcated bus width modification (e.g., restoring those bifurcatedbus(es) to the default bifurcated bus width discussed above). Similarly as described above, the bifurcated bus width restoration operations 1300 may include the bifurcated bus width modification engine 214 accessing and modifying switch bifurcation bus register(s) in the switch device 206, generating and transmitting bifurcated bus width modification instruction(s) that are configured to cause the switch device 206 to perform the bifurcated bus width modifications described below (e.g., with the switch device 206 entering a PCIe switch device "recovery mode" to perform those bifurcated bus width modifications), and/or utilizing any other bifurcated bus width modification techniques that would be apparent to one of skill in the art in possession of the present disclosure.

With reference to FIG. 13B and in this second example of block 316, the bifurcated bus width restoration operations 1300 provide for a decrease in the bifurcated bus width of the bifurcated bus provided by the switch device 206 to transfer data between the NVMe storage device 210a and the root port 204a (i.e., from "×4" back to the "×2"/default bifurcated bus width in the example illustrated in FIGS. 13A and 13B), and an increase in a bifurcated bus width of the bifurcated buses provided by the switch device 206 to transfer data between each of the NVMe storage devices 210c and 210d and the root port 204a (i.e., from "×1" back to the "×2"/default bifurcated bus width in the example illustrated in FIGS. 13A and 13B). In some examples, the bifurcated bus width restoration operations 1300 may include the bifurcated bus width modification engine 214 performing each of the respective bifurcated bus width modifications described above. However, in other examples, the bifurcated bus width restoration operations 1300 may include the bifurcated bus width modification engine 214 requesting the switch device 206 provide the default bifurcated bus width for each of the bifurcated buses provided for the NVMe storage devices 210a, 1800, 210c, and 210d (e.g., "×2" in this example).

As discussed above, while examples of the dynamic bifurcated bus width modifications of the present disclosure have been illustrated and described for use with RAID data rebuild operations and RAID data copy operations, the dynamic bifurcated bus width modifications of the present disclosure may be used with other RAID data movement operations (e.g., those involved in storage capacity expansions performed during OCE operations) while remaining within the scope of the present disclosure as well.

Thus, systems and methods have been described that provide for the dynamic modification of bifurcated bus widths of bifurcated bus(es) that are provided by a switch device to transfer data in a RAID storage system between storage device(s) and a root port on a primary processing system. For example, the dynamic bifurcated bus width RAID storage system of the present disclosure may include storage devices coupled to a root port on a processor via a switch that provides a respective bifurcated bus to transfer data between each storage device and the root port. A bifurcated bus width modification subsystem monitors the storage devices during their provisioning of a RAID storage system, determines that a RAID data movement operation is required, and retrieves a bifurcated bus width for each respective bifurcated bus provided by the switch to transfer data between each storage device and the root port. The bifurcated bus width modification subsystem then identifies a first storage device to which data will be written as part of the RAID data movement operation and, prior to its performance, increases a first bifurcated bus width for a first bifurcated bus provided by the switch to transfer data between the first storage device and the root port. As such, RAID data movement operations may be completed relatively quickly (as compared to RAID data movement operations performed in conventional RAID storage systems) by allocating available bifurcated bus bandwidth to storage device(s) that would otherwise introduce bottleneck(s) in those RAID data movement operations.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A dynamic bifurcated bus width Redundant Array of Independent Disk (RAID) storage system, comprising:
   a processing system including a root port;
   a plurality of storage devices that are configured to provide a Redundant Array of Independent Disk (RAID) storage system;
   a switch device that couples each of the plurality of storage devices to the root port and provides a respective bifurcated bus to transfer data between each of the plurality of storage devices and the root port; and
   a bifurcated bus width modification subsystem that is coupled to the processing system, the plurality of storage devices, and the switch device, wherein the bifurcated bus width modification subsystem is configured to:
      monitor the plurality of storage devices during the provisioning of the RAID storage system by the plurality of storage devices;
      determine, in response to the monitoring of the plurality of storage devices, that a RAID data movement operation is required;
      retrieve, in response to determining that the RAID data movement operation is required, a bifurcated bus width for each respective bifurcated bus provided by the switch device to transfer data between each of the plurality of storage devices and the root port;
      identify a first storage device that is included in the plurality of storage devices and to which data will be written as part of the RAID data movement operation; and
      increase, prior to performance of the RAID data movement operation, a first bifurcated bus width for a first bifurcated bus provided by the switch device to transfer data between the first storage device and the root port.

2. The system of claim 1, wherein the bifurcated bus width modification subsystem is configured to:
   identify a second storage device that is included in the plurality of storage devices and that is not involved in the RAID data movement operation; and
   decrease, prior to performance of the RAID data movement operation, a second bifurcated bus width for a second bifurcated bus provided by the switch device to transfer data between the second storage device and the root port.

3. The system of claim 1, wherein the data movement operation is either a RAID data rebuild operation or a RAID data copy operation.

4. The system of claim 1, wherein the identifying the first storage device to which data will be written as part of the RAID data movement operation includes:
   identifying the first storage device has a hot spare storage device provided for the RAID storage system.

5. The system of claim 1, wherein each of the plurality of storage devices is provided by a respective Non-Volatile Memory express (NVMe) storage device that is connected to a respective port on the switch device via four physical communication channels.

6. The system of claim 1, wherein the bifurcated bus width modification subsystem is configured to:
   decrease, subsequent to performance of the RAID data movement operation, the first bifurcated bus width for the first bifurcated bus provided by the switch device to transfer data between the first storage device and the root port.

7. An Information Handling System (IHS), comprising:
   a bifurcated bus width modification processing system; and
   a bifurcated bus width modification memory system that is coupled to the bifurcated bus width modification processing system and that includes instructions that, when executed by the bifurcated bus width modification processing system, cause the bifurcated bus width modification processing system to provide a bifurcated bus width modification engine that is configured to:
      monitor a plurality of storage devices that are coupled to the bifurcated bus width modification processing system during the provisioning of a Redundant Array of Independent Disk (RAID) storage system by the plurality of storage devices;
      determine, in response to the monitoring of the plurality of storage devices, that a RAID data movement operation is required;
      retrieve, in response to determining that the RAID data movement operation is required, a bifurcated bus width for each respective bifurcated bus provided by a switch device to transfer data between each of the plurality of storage devices and a root port in a primary processing system;
      identify a first storage device that is included in the plurality of storage devices and to which data will be written as part of the RAID data movement operation; and
      increase, prior to performance of the RAID data movement operation, a first bifurcated bus width for a first bifurcated bus provided by the switch device to transfer data between the first storage device and the root port.

8. The IHS of claim 7, wherein the bifurcated bus width modification engine is configured to:
   identify a second storage device that is included in the plurality of storage devices and that is not involved in the RAID data movement operation; and
   decrease, prior to performance of the RAID data movement operation, a second bifurcated bus width for a second bifurcated bus provided by the switch device to transfer data between the second storage device and the root port.

9. The IHS of claim 7, wherein the data movement operation is either a RAID data rebuild operation or a RAID data copy operation.

10. The IHS of claim 7, wherein the identifying the first storage device to which data will be written as part of the RAID data movement operation includes:
   identifying the first storage device has a hot spare storage device provided for the RAID storage system.

11. The IHS of claim 7, wherein each of the plurality of storage devices is provided by a respective Non-Volatile Memory express (NVMe) storage device that is connected to a respective port on the switch device via four physical communication channels.

12. The IHS of claim 7, wherein the bifurcated bus width modification engine is configured to:
   decrease, subsequent to performance of the RAID data movement operation, the first bifurcated bus width for the first bifurcated bus provided by the switch device to transfer data between the first storage device and the root port.

13. The IHS of claim 7, wherein the increasing the first bifurcated bus width for the first bifurcated bus provided by the switch device to transfer data between the first storage device and the root port includes maximizing the first bifurcated bus width for the first bifurcated bus provided by the switch device to transfer data between the first storage device and the root port.

14. A method for providing dynamic bifurcated bus widths for bifurcated buses used in a Redundant Array of Independent Disk (RAID) storage system, comprising:
   monitoring, by a bifurcated bus width modification subsystem, a plurality of storage devices during the provisioning of a Redundant Array of Independent Disk (RAID) storage system by the plurality of storage devices;
   determining, by the bifurcated bus width modification subsystem in response to the monitoring of the plurality of storage devices, that a RAID data movement operation is required;
   retrieving, by the bifurcated bus width modification subsystem in response to determining that the RAID data movement operation is required, a bifurcated bus width for each respective bifurcated bus provided by a switch device to transfer data between each of the plurality of storage devices and a root port in a primary processing system;
   identifying, by the bifurcated bus width modification subsystem, a first storage device that is included in the plurality of storage devices and to which data will be written as part of the RAID data movement operation; and
   increasing, by the bifurcated bus width modification subsystem prior to performance of the RAID data movement operation, a first bifurcated bus width for a first bifurcated bus provided by the switch device to transfer data between the first storage device and the root port.

15. The method of claim 14, further comprising:
   identifying, by the bifurcated bus width modification subsystem, a second storage device that is included in the plurality of storage devices and that is not involved in the RAID data movement operation; and
   decreasing, by the bifurcated bus width modification subsystem prior to performance of the RAID data movement operation, a second bifurcated bus width for a second bifurcated bus provided by the switch device to transfer data between the second storage device and the root port.

16. The method of claim 14, wherein the data movement operation is either a RAID data rebuild operation or a RAID data copy operation.

17. The method of claim 14, wherein the identifying the first storage device to which data will be written as part of the RAID data movement operation includes:
   identifying the first storage device has a hot spare storage device provided for the RAID storage system.

18. The method of claim 14, wherein each of the plurality of storage devices is provided by a respective Non-Volatile Memory express (NVMe) storage device that is connected to a respective port on the switch device via four physical communication channels.

19. The method of claim 14, further comprising:
   decreasing, by the bifurcated bus width modification subsystem subsequent to performance of the RAID data movement operation, the first bifurcated bus width for the first bifurcated bus provided by the switch device to transfer data between the first storage device and the root port.

20. The method of claim 14, wherein the increasing the first bifurcated bus width for the first bifurcated bus provided by the switch device to transfer data between the first storage device and the root port includes maximizing the first bifurcated bus width for the first bifurcated bus provided by the switch device to transfer data between the first storage device and the root port.

* * * * *